(12) United States Patent
Segalov et al.

(10) Patent No.: US 10,997,632 B2
(45) Date of Patent: May 4, 2021

(54) ADVERTISEMENT CAMPAIGN FILTERING WHILE MAINTAINING DATA PRIVACY FOR AN ADVERTISER AND A PERSONAL COMPUTING DEVICE

(71) Applicant: Triapodi Ltd., Herzliya (IL)

(72) Inventors: Yaron Segalov, Even Yehuda (IL); Amir Maor, Ramat Hasharon (IL); Nir Peer, Tel Aviv (IL); Arseny Cherkasov, Herzliya (IL)

(73) Assignee: Triapodi Ltd., Herzliya (IL)

( * ) Notice: Subject to any disclaimer, the term of this patent is extended or adjusted under 35 U.S.C. 154(b) by 0 days.

(21) Appl. No.: 16/514,732

(22) Filed: Jul. 17, 2019

(65) Prior Publication Data
US 2020/0027120 A1 Jan. 23, 2020

Related U.S. Application Data

(63) Continuation of application No. 16/513,049, filed on Jul. 16, 2019.
(Continued)

(51) Int. Cl.
*G06Q 30/02* (2012.01)
*G06F 21/62* (2013.01)
*H04W 12/08* (2021.01)

(52) U.S. Cl.
CPC ..... *G06Q 30/0271* (2013.01); *G06F 21/6263* (2013.01); *G06Q 30/0243* (2013.01);
(Continued)

(58) Field of Classification Search
CPC ........... G06Q 30/0257; G06Q 30/0243; G06Q 30/0254
See application file for complete search history.

(56) References Cited

U.S. PATENT DOCUMENTS

| 8,838,784 B1 | 9/2014 | Kalavade |
| 8,930,381 B2 * | 1/2015 | Raghunathan ...... G06F 21/6254 707/756 |

(Continued)

OTHER PUBLICATIONS

R.Uda, "Privacy Obfuscation with Bloom Filter for Effective Advertisement," 2013 Workshops of 27th International Conference on Advanced Information Networking and Applications (WAINA), pp. 6, Retrieved on Jan. 1, 2021 from: <https://dialog.proquest.com/professional/docview/1400602361?accountid=131444.> (Year: 2013).*
(Continued)

*Primary Examiner* — Abhishek Vyas
*Assistant Examiner* — Monica A Mandel
(74) *Attorney, Agent, or Firm* — Finnegan, Henderson, Farabow, Garrett & Dunner, LLP

(57) ABSTRACT

Disclosed embodiments relate to performing an advertisement campaign filtering process while protecting the privacy of both an advertiser and a user of a personal computing device. Techniques include maintaining a plurality of sets of advertising competition rules, the plurality of sets of advertising competition rules being associated with a plurality of discrete advertising campaigns; for a set of advertising competition rules from the plurality of sets of advertising competition rules: identifying advertisement targeting criteria associated with the set of advertising competition rules, differentiating, from within the advertisement targeting criteria, between advertisement-sensitive targeting criteria and advertiser-insensitive criteria, and transforming the advertisement-sensitive sensitive targeting criteria; and transmitting, to the personal computing device, at least a portion of the transformed advertisement-sensitive targeting criteria.

16 Claims, 10 Drawing Sheets

Related U.S. Application Data

(60) Provisional application No. 62/817,336, filed on Mar. 12, 2019, provisional application No. 62/699,744, filed on Jul. 18, 2018.

(52) U.S. Cl.
CPC ..... *G06Q 30/0254* (2013.01); *G06Q 30/0257* (2013.01); *G06Q 30/0267* (2013.01); *G06Q 30/0269* (2013.01); *G06Q 30/0277* (2013.01); *H04W 12/08* (2013.01)

(56) References Cited

U.S. PATENT DOCUMENTS

| | | | |
|---|---|---|---|
| 10,636,056 B2* | 4/2020 | Chakraborty | ...... G06Q 30/0255 |
| 2010/0125500 A1 | 5/2010 | Beavers et al. | |
| 2011/0153396 A1* | 6/2011 | Marcuvitz | .............. G06Q 20/02 705/14.2 |
| 2014/0372216 A1* | 12/2014 | Nath | .................. G06Q 30/0256 705/14.54 |
| 2017/0140426 A1* | 5/2017 | Chakraborty | ...... G06Q 30/0255 |

OTHER PUBLICATIONS

PCT International Search Report and Written Opinion of the International Searching Authority, for corresponding Application No. PCT/IB2019/056072, dated Nov. 18, 2019 (3 pages).

PCT Written Opinion of the International Searching Authority for corresponding Application No. PCT/IB2019/056072, dated Nov. 18, 2019 (4 pages).

Extended European Search Report, Rule 62 EPC, issued by the European Patent Office in corresponding application No. EP 19 83 7762 (Reference No. 15039.0002-00155) dated Nov. 4, 2020 (7 pages).

* cited by examiner

ADVERTISEMENT CAMPAIGN FILTERING WHILE MAINTAINING DATA PRIVACY FOR AN ADVERTISER AND A PERSONAL COMPUTING DEVICE

PRIORITY CLAIM

This application is a continuation of and claims the benefit of priority to U.S. patent application Ser. No. 16/513,049, filed Jul. 16, 2019, which claims priority to U.S. Provisional Application No. 62/817,336, filed Mar. 12, 2019, and U.S. Provisional Application No. 62/699,744, filed Jul. 18, 2018. The contents of the foregoing applications are hereby incorporated herein by reference in their entireties.

BACKGROUND

Online and mobile advertising are becoming increasingly prevalent and highly targeted. Advertising may take the form of promotional marketing messages, electronic coupons or offers, political statements, social communications, and various other types of messages sent to user devices (e.g., mobile devices, wearables, desktop computers, etc.). The growth and popularity of electronic advertising has incentivized an increase in the collection of users' private data by social media and advertising platforms (e.g., Facebook™, Google™, Microsoft™, Twitter™, etc.). These entities develop techniques to select and/or bid for electronic advertisements based on various types of user data in order to send targeted advertisements to users' devices on behalf of advertisers. For these entities, the more user data they are able to gather, and the more meaningful that data is from an advertising perspective, the better they are able to perform targeted electronic advertising.

While advertising platforms and advertisers have an incentive to collect and leverage personal data of users, they are limited by concerns of user privacy. For example, in Europe the General Data Protection Regulation restricts the collection and use of personally private data, and similar rules govern advertising activity in the United States. Part of the impetus behind these rules is a desire to shield user data from companies, especially to protect their highly sensitive or personal data. Another motivation is reducing the damage that can flow from personal data being shared with unauthorized entities. For example, a security breach at a social media platform could result in a potential leak of millions of users' private data. Further, just as individual users have privacy interests in their data, so to do advertising campaign providers. The entities that develop algorithms for targeting users and managing advertisement bidding schemes invest significantly in developing techniques based on their unique needs and strategies. Thus, advertising campaign providers also need privacy protections for their advertising campaigns to guard against security breaches or fraud.

Current methods of providing targeted advertisements are not sufficiently secure and protective of data privacy. According to current techniques, electronic advertisement platforms may collect personal or sensitive data they are not permitted to collect, and may use that data in administering targeted advertisement campaigns. Advertisement platforms that do not collect meaningful personal or sensitive data, on the other hand, may be unable to adequately perform targeting or price bidding for particular advertisement campaigns. Consequently, existing techniques for targeted advertising result in compromised privacy for individuals, weaker targeting for advertisements, or both. Further, when advertisers' own targeted campaign rules are shared with advertising platforms, there is a risk that the advertisers' or the platforms' own business data (e.g., campaign parameters) will be shared with competitors or other unauthorized entities.

Accordingly, in view of these and other deficiencies in existing techniques, technological solutions are needed for providing targeted advertisements in a secure manner that leverages personal or sensitive data without that data being shared externally from users' personal devices. Solutions should advantageously allow safe and secure use of user's private data without requiring that such data be transmitted to an advertising platform. Further, solutions should allow for more deeply and richly targeted advertisements while maintaining data privacy.

SUMMARY

The disclosed embodiments describe non-transitory computer readable media, systems, and methods for conducting a real-time selection of a targeted advertisement on a personal computing device. For example, in an exemplary embodiment, there may be a non-transitory computer readable medium including instructions that, when executed by at least one processor, cause the at least one processor to perform operations for conducting a real-time selection of a targeted advertisement on a personal computing device. The operations may comprise receiving, on the personal computing device, a plurality of sets of advertising competition rules, the plurality of sets of advertising competition rules being associated with a plurality of discrete advertising campaigns; identifying an opportunity to display a targeted advertisement to a user of the personal computing device; accessing sensitive data associated with the user stored locally on the personal computing device, wherein the sensitive data is not made available outside of the personal computing device without authorization from the user; conducting, based on the identified opportunity and using the accessed sensitive data, a real-time selection to identify at least one of the plurality of discrete advertising campaigns, wherein the real-time selection is based on one or more of the plurality of sets of advertising competition rules; and receiving a targeted advertisement on the personal computing device associated with the selected at least one discrete advertising campaign.

According to a disclosed embodiment, the instructions are configured to be integrated into a software application to run on the personal computing device.

According to a disclosed embodiment, the personal computing device is at least one of: a mobile device, a smart-clothing device, a tablet, a smart television, or a personal computer.

According to a disclosed embodiment, the plurality of sets of advertising competition rules are configured by an advertisement campaign provider system.

According to a disclosed embodiment, the plurality of sets of advertising competition rules identify at least one of: a maximum bid price, a frequency cap, a demographic characteristic, or a behavioral characteristic.

According to a disclosed embodiment, the plurality of sets of advertising competition rules are specific to the identified opportunity.

According to a disclosed embodiment, the identified opportunity includes at least one of: application usage by the user, purchase activity of the user, a real time location of the personal computing device, or a location of the user.

According to a disclosed embodiment, the real-time selection is based on two or more of the plurality of sets of advertising competition rules.

According to a disclosed embodiment, the operations may further comprise sending a request for the targeted advertisement.

According to a disclosed embodiment, the targeted advertisement was stored on the personal computing device before the real-time selection.

According to a disclosed embodiment, the targeted advertisement is received from a remote server after the real-time selection.

According to a disclosed embodiment, the operations may further comprise receiving, from the personal computing device, an indication of the targeted advertisement.

According to a disclosed embodiment, the operations may further comprise receiving, from the personal computing device, an indication of what information associated with the user was used in the real-time selection.

According to a disclosed embodiment, the operations may further comprise caching, for a future real-time selection, at least one of the plurality of sets of advertising competition rules.

According to a disclosed embodiment, the operations may further comprise receiving a plurality of targeted advertisements and caching at least one of the plurality of targeted advertisements for a future real-time selection.

According to a disclosed embodiment, the real-time selection is performed at least in part using a graphics processing unit of the personal computing device.

According to another disclosed embodiment, a computer-implemented method may be implemented for conducting a real-time selection of a targeted advertisement on a personal computing device. The method may comprise receiving, on the personal computing device, a plurality of sets of advertising competition rules, the plurality of sets of advertising competition rules being associated with a plurality of discrete advertising campaigns; identifying an opportunity to display a targeted advertisement to a user of the personal computing device; accessing sensitive data associated with the user stored locally on the personal computing device, wherein the sensitive data is not made available outside of the personal computing device without authorization from the user; conducting, based on the identified opportunity and using the accessed sensitive data, a real-time selection to identify at least one of the plurality of discrete advertising campaigns, wherein the real-time selection is based on one or more of the plurality of sets of advertising competition rules; and receiving a targeted advertisement on the personal computing device associated with the selected at least one discrete advertising campaign.

According to a disclosed embodiment, the instructions are configured to be integrated into a software application to run on the personal computing device.

According to a disclosed embodiment, the personal computing device is at least one of: a mobile device, a smart-clothing device, a tablet, a smart television, or a personal computer.

According to a disclosed embodiment, the plurality of sets of advertising competition rules are configured by an advertisement campaign provider system.

The disclosed embodiments also describe non-transitory computer readable media, systems, and methods for receiving a targeted advertisement on a personal computing device without revealing sensitive data of a user of the personal computing device. For example, in an exemplary embodiment, there may be a non-transitory computer readable medium including instructions that, when executed by at least one processor, cause the at least one processor to perform operations for conducting a real-time selection of a targeted advertisement on a personal computing device. The operations may comprise maintaining, on a personal computing device, sensitive data associated with the user, the sensitive data being at least one of: behavioral data associated with the user or demographic data associated with the user; identifying, on the personal computing device, while the user is interacting with an application running on the personal computing device, an opportunity to display a targeted advertisement to the user of the personal computing device; receiving, on the personal computing device, a prompt to request a targeted advertisement for display on the personal computing device, the targeted advertisement being part of a discrete advertising campaign selected based on the sensitive data associated with the user; wherein the sensitive data associated with the user is maintained securely on the personal computing device and not shared external to the personal computing device without the user's authorization; and requesting, based on the prompt, the targeted advertisement for display on the personal computing device.

According to a disclosed embodiment, the prompt is transparent to the user of the personal computing device.

According to a disclosed embodiment, the operations may further comprise receiving the targeted advertisement in response to the requesting.

According to a disclosed embodiment, the sensitive data is maintained in a sandbox environment on the personal computing device.

According to a disclosed embodiment, the user interacting with the application includes at least one of: user downloading a web page, user following a link in the web page, user interacting with an application that allows for advertisements, or a user clicking on a uniform resource locator (URL).

According to a disclosed embodiment, the personal computing device is at least one of: a mobile device, a smart-clothing device, a tablet, a smart television, or a personal computer.

According to a disclosed embodiment, the prompt is an embedded link or pointer in a web page or application.

According to another disclosed embodiment, a computer-implemented method may be implemented for receiving a targeted advertisement on a personal computing device without revealing sensitive data of a user of the personal computing device. The method may comprise receiving, on the personal computing device, a plurality of sets of advertising competition rules, the plurality of sets of advertising competition rules being associated with a plurality of discrete advertising campaigns; identifying an opportunity to display a targeted advertisement to a user of the personal computing device; accessing sensitive data associated with the user stored locally on the personal computing device, wherein the sensitive data is not made available outside of the personal computing device without authorization from the user; conducting, based on the identified opportunity and using the accessed sensitive data, a real-time selection to identify at least one of the plurality of discrete advertising campaigns, wherein the real-time selection is based on one or more of the plurality of sets of advertising competition rules; and receiving a targeted advertisement on the personal computing device associated with the selected at least one discrete advertising campaign.

According to a disclosed embodiment, the prompt is transparent to the user of the personal computing device.

According to a disclosed embodiment, the operations may further comprise receiving the targeted advertisement in response to the requesting.

According to a disclosed embodiment, the sensitive data is maintained in a sandbox environment on the personal computing device.

According to a disclosed embodiment, the user interacting with the application includes at least one of: user downloading a web page, user following a link in the web page, user interacting with an application that allows for advertisements, or a user clicking on a uniform resource locator (URL).

According to a disclosed embodiment, the personal computing device is at least one of: a mobile device, a smart-clothing device, a tablet, a smart television, or a personal computer.

According to a disclosed embodiment, the prompt is an embedded link or pointer in a web page or application.

According to another disclosed embodiment, there may be a personal computing device comprising a memory storing software instructions for receiving a targeted advertisement on the personal computing device without revealing sensitive data of a user of the personal computing device; and a hardware-based processor configured to execute the software instructions to perform operations. The operations may comprise maintaining, on a personal computing device, sensitive data associated with the user, the sensitive data being at least one of: behavioral data associated with the user or demographic data associated with the user; identifying, on the personal computing device, while the user is interacting with an application running on the personal computing device, an opportunity to display a targeted advertisement to the user of the personal computing device; receiving, on the personal computing device, a prompt to request a targeted advertisement for display on the personal computing device, the targeted advertisement being part of a discrete advertising campaign selected based on the sensitive data associated with the user; wherein the sensitive data associated with the user is maintained securely on the personal computing device and not shared external to the personal computing device without the user's authorization; and requesting, based on the prompt, the targeted advertisement for display on the personal computing device.

According to a disclosed embodiment, the prompt is transparent to the user of the personal computing device.

According to a disclosed embodiment, the operations may further comprise receiving the targeted advertisement in response to the requesting.

According to a disclosed embodiment, the sensitive data is maintained in a sandbox environment on the personal computing device.

According to a disclosed embodiment, the user interacting with the application includes at least one of: user downloading a web page, user following a link in the web page, user interacting with an application that allows for advertisements, or a user clicking on a uniform resource locator (URL).

According to a disclosed embodiment, the personal computing device is at least one of: a mobile device, a smart-clothing device, a tablet, a smart television, or a personal computer.

The disclosed embodiments also describe non-transitory computer readable media, systems, and methods for efficiently providing advertising competition rules to a personal computing device of a user. For example, in an exemplary embodiment, there may be a non-transitory computer readable medium including instructions that, when executed by at least one processor, cause the at least one processor to perform operations for efficiently providing advertising competition rules to a personal computing device of a user. The operations may comprise maintaining a plurality of sets of advertising competition rules, the plurality of sets of advertising competition rules being associated with a plurality of discrete advertising campaigns, wherein the plurality of sets of advertising competition rules are capable of being applied by the personal computing device; receiving non-personal advertisement targeting data from the personal computing device, the non-personal advertisement targeting data including one or more non-personally identifying characteristics of the user; filtering the plurality of sets of advertising competition rules using a filtering technique, based on the non-personal advertisement targeting data, to identify a subset of the plurality of sets of advertising competition rules; and transmitting the subset of the plurality of sets of advertising competition rules to the personal computing device, wherein the subset of the plurality of sets of advertising competition rules are configured to be applied by the personal computing device in a real-time selection of an advertising campaign associated with a targeted advertisement to be received by the personal computing device.

According to a disclosed embodiment, the real-time selection of the advertising campaign is based on the non-personal advertisement targeting data.

According to a disclosed embodiment, the real-time selection of the advertising campaign is based on personally identifying advertisement targeting data.

According to a disclosed embodiment, the non-personal advertisement targeting data identifies a geographical location of the user.

According to a disclosed embodiment, the non-personal advertisement targeting data identifies a subject matter interest of the user.

According to a disclosed embodiment, the non-personal advertisement targeting data is an anonymized version of personally identifying advertisement targeting data stored on the personal computing device.

According to a disclosed embodiment, the filtering technique includes applying a Bloom filter.

According to a disclosed embodiment, the operations may further comprise applying a minimum threshold to the subset of the plurality of sets of advertising competition rules.

According to a disclosed embodiment, the operations may further comprise applying a frequency capping rule to the subset of the plurality of sets of advertising competition rules.

According to another disclosed embodiment, a computer-implemented method may be implemented for efficiently providing advertising competition rules to a personal computing device of a user. The method may comprise maintaining a plurality of sets of advertising competition rules, the plurality of sets of advertising competition rules being associated with a plurality of discrete advertising campaigns, wherein the plurality of sets of advertising competition rules are capable of being applied by the personal computing device; receiving non-personal advertisement targeting data from the personal computing device, the non-personal advertisement targeting data including one or more non-personally identifying characteristics of the user; filtering the plurality of sets of advertising competition rules using a filtering technique, based on the non-personal advertisement targeting data, to identify a subset of the plurality of sets of advertising competition rules; and transmitting the subset of the plurality of sets of advertising competition rules to the personal computing device, wherein the subset of the plurality of sets of advertising competition rules are configured to be applied by the personal computing device in a real-time selection of an advertising campaign associated with a targeted advertisement to be received by the personal computing device.

According to a disclosed embodiment, the real-time selection of the advertising campaign is based on the non-personal advertisement targeting data.

According to a disclosed embodiment, the real-time selection of the advertising campaign is based on personally identifying advertisement targeting data.

According to a disclosed embodiment, the non-personal advertisement targeting data identifies a geographical location of the user.

According to a disclosed embodiment, the non-personal advertisement targeting data identifies a subject matter interest of the user.

According to a disclosed embodiment, the non-personal advertisement targeting data is an anonymized version of personally identifying advertisement targeting data stored on the personal computing device.

According to a disclosed embodiment, the filtering technique includes applying a Bloom filter.

According to a disclosed embodiment, the operations may further comprise applying a minimum threshold to the subset of the plurality of sets of advertising competition rules.

According to a disclosed embodiment, the operations may further comprise applying a frequency capping rule to the subset of the plurality of sets of advertising competition rules.

The disclosed embodiments describe non-transitory computer readable media, systems, and methods for performing an advertisement campaign filtering process while protecting the privacy of both an advertiser and a user of a personal computing device. For example, in an exemplary embodiment, there may be a non-transitory computer readable medium including instructions that, when executed by at least one processor, cause the at least one processor to perform operations for performing an advertisement campaign filtering process while protecting the privacy of both an advertiser and a user of a personal computing device. The operations may comprise maintaining a plurality of sets of advertising competition rules, the plurality of sets of advertising competition rules being associated with a plurality of discrete advertising campaigns, wherein the plurality of sets of advertising competition rules are capable of being applied by the personal computing device; for a set of advertising competition rules from the plurality of sets of advertising competition rules: identifying advertisement targeting criteria associated with the set of advertising competition rules, differentiating, from within the advertisement targeting criteria, between advertisement-sensitive targeting criteria and advertiser-insensitive criteria, transforming the advertisement-sensitive targeting criteria, and transmitting, to the personal computing device, at least a portion of the transformed advertisement-sensitive targeting criteria; receiving a response from the personal computing device, the response being based on a comparison, by the personal computing device, of the transmitted advertisement-sensitive targeting criteria with data stored on the personal computing device; and determining, based on the response, whether the set of advertising competition rules should be transmitted to the personal computing device.

According to a disclosed embodiment, transforming the advertisement-sensitive targeting criteria includes applying a lossy filter to the advertisement-sensitive targeting criteria.

According to a disclosed embodiment, transforming the advertisement-sensitive targeting criteria includes applying a bit array filter to the advertisement-sensitive targeting criteria.

According to a disclosed embodiment, transforming the advertisement-sensitive targeting criteria includes applying a Bloom filter to the advertisement-sensitive targeting criteria.

According to a disclosed embodiment, there are two portions of the transformed advertisement-sensitive targeting criteria, and a first of the two portions is transmitted to the personal computing device.

According to a disclosed embodiment, there are two portions of the transformed advertisement-sensitive targeting criteria, and a second of the two portions is stored on a server remote from the personal computing device.

According to a disclosed embodiment, the data stored on the personal computing device used in the comparison is sensitive data of a user of the personal computing device.

According to a disclosed embodiment, the data stored on the personal computing device used in the comparison is not transmitted from the personal computing device.

According to a disclosed embodiment, the transformed advertisement-sensitive targeting criteria is expressed in a bit array.

According to a disclosed embodiment, the response from the personal computing device includes one or more pointers corresponding to the bit array.

According to another disclosed embodiment, a computer-implemented method may be implemented for performing an advertisement campaign filtering process while protecting the privacy of both an advertiser and a user of a personal computing device. The method may comprise maintaining a plurality of sets of advertising competition rules, the plurality of sets of advertising competition rules being associated with a plurality of discrete advertising campaigns, wherein the plurality of sets of advertising competition rules are capable of being applied by the personal computing device; for a set of advertising competition rules from the plurality of sets of advertising competition rules: identifying advertisement targeting criteria associated with the set of advertising competition rules, differentiating, from within the advertisement targeting criteria, between advertisement-sensitive targeting criteria and advertiser-insensitive criteria, transforming the advertisement-sensitive targeting criteria, and transmitting, to the personal computing device, at least a portion of the transformed advertisement-sensitive targeting criteria; receiving a response from the personal computing device, the response being based on a comparison, by the personal computing device, of the transmitted advertisement-sensitive targeting criteria with data stored on the personal computing device; and determining, based on the response, whether the set of advertising competition rules should be transmitted to the personal computing device.

According to a disclosed embodiment, transforming the advertisement-sensitive targeting criteria includes applying a lossy filter to the advertisement-sensitive targeting criteria.

According to a disclosed embodiment, transforming the advertisement-sensitive targeting criteria includes applying a bit array filter to the advertisement-sensitive targeting criteria.

According to a disclosed embodiment, transforming the advertisement-sensitive targeting criteria includes applying a Bloom filter to the advertisement-sensitive targeting criteria.

According to a disclosed embodiment, there are two portions of the transformed advertisement-sensitive targeting criteria, and a first of the two portions is transmitted to the personal computing device.

According to a disclosed embodiment, there are two portions of the transformed advertisement-sensitive targeting criteria, and a second of the two portions is stored on a server remote from the personal computing device.

According to a disclosed embodiment, the data stored on the personal computing device used in the comparison is sensitive data of a user of the personal computing device.

According to a disclosed embodiment, the data stored on the personal computing device used in the comparison is not transmitted from the personal computing device.

According to a disclosed embodiment, the transformed advertisement-sensitive targeting criteria is expressed in a bit array.

According to a disclosed embodiment, the response from the personal computing device includes one or more pointers corresponding to the bit array.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order, sequence, or constrained to a particular system configuration. Additionally, some of the described embodiments or elements thereof can occur or be performed simultaneously, at the same point in time, or concurrently.

Reference will now be made in detail to the disclosed embodiments, examples of which are illustrated in the accompanying drawings.

Figure 1:
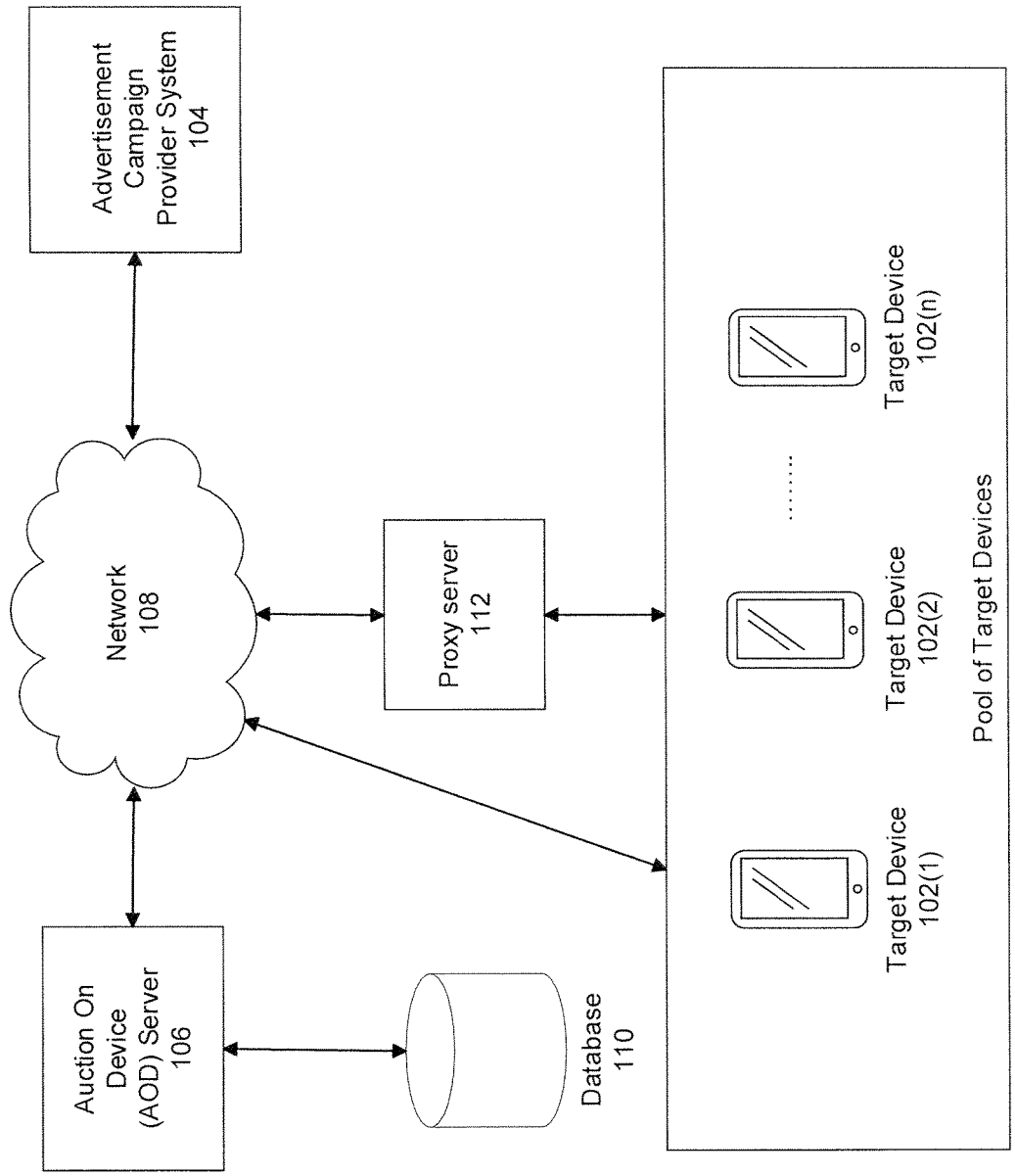
FIG. 1 is a block diagram of an exemplary system for conducting real-time selections of targeted advertisements, consistent with disclosed embodiments.

FIG. 1 illustrates an exemplary system 100 for real-time selection of targeted advertisements by target devices 102 (1)-102(n) while maintaining user privacy. System 100 may include one or more auction on device (AOD) servers 106, one or more databases 110, one or more target devices 102(1)-102(n), together referred to as a pool of target devices, one or more proxy servers 112, one or more advertising campaign provider systems 104, and one or more network 108, as shown in FIG. 1. The components and arrangement of the components included in system 100 may vary. Thus, system 100 may include other components that perform or assist in the performance of one or more processes, or fewer components, consistent with the disclosed embodiments.

Components of system 100 may include computing devices (e.g., computer(s), server(s), etc.) with memory storing data and/or software instructions (e.g., server code, client code, databases, etc.). In some embodiments, the one or more computing devices may be configured to execute software instructions stored on one or more memory devices to perform one or more operations consistent with the disclosed embodiments. AOD server 106, databases 110, proxy server 112, target devices 102(1)-102(n), and advertising campaign provider system 104 may be configured to communicate with each other, or with other components external to system 100, via network 108. Users may operate target devices 102(1)-102(n) to interact with one or more components of system 100 to send and receive communications, initiate operations, and/or provide input for one or more operations consistent with the disclosed embodiments.

The techniques of real-time selection of targeted advertisements by target devices 102(1)-102(n) while maintaining user privacy described herein overcome several technological problems relating to security, privacy, and the effectiveness of electronic advertisement targeting. As discussed below, the disclosed embodiments provide techniques for target devices 102(1)-102(n) to obtain targeted advertisements and display them, without requiring that personal or sensitive data leave target devices 102(1)-102(n). The target devices 102(1)-102(n) may generate and transmit an advertising campaign request to an auction on device (AOD) server 106 or to a proxy server 112. The advertising campaign request may include one or more types of non-personal advertisement targeting data, as discussed further below. The non-personal advertisement targeting data may be stored in target device 102. The AOD server 106 (or proxy server 112) may then filter a list of advertising campaigns previously stored in a memory of the AOD server 106 (or proxy server 112) to select a subset of campaigns relevant to the user of device 102 or the device 102 itself. The advertising campaigns may also be stored in database 110 in some embodiments and accessible to AOD server 106 (or proxy server 112).

The non-personal advertisement targeting data may be used to select a first set of discrete advertising campaigns or corresponding campaign rules. In response to the advertising campaign request, the AOD server 106 may transmit the first set of discrete advertising campaigns to a target device 102(1)-102(n). Each of the first set of discrete advertising campaigns may be associated with a set of advertising competition rules stored in the database 110. Upon receiving the first set of discrete advertising campaigns, a target device 102(1)-102(n) may identify an opportunity to display a targeted advertisement based on a user's interaction with an application running on the target device 102(1)-102(n). For example, as discussed below, the user may load a web page or application that includes an advertising placeholder or marker. Upon identifying the opportunity to display a targeted advertisement, the target device 102(1)-102(n) may access sensitive data stored on the target device 102(1)-102(n) and conduct a real time selection of one of the first set of discrete advertising campaigns based at least in part on that sensitive data and the set of advertising competition rules. The sensitive data may include the user's personal information or other advertisement-relevant data available on the target device 102(1)-102(n). Users' personal information may include, for example, their age, marital status, financial information, sexual orientation, personal traits or preferences, credit card transactions, type of stores where the user shops, etc. Also, the sensitive data may include actions performed by the user on the target device 102(1)-102(n). Actions may include the amount of time spent on a website or page, interactions with a website or page, search terms input by the user while utilizing a search engine, types of applications installed on target device 102(1)-102(n), interactions with the applications, amount of time spent on the applications, and various other types of activity or actions.

As discussed further below, the personal or sensitive data stored on the target device 102(1)-102(n) may not be made available outside of the target device 102(1)-102(n) (e.g., at all, or without authorization from the user). Upon accessing the sensitive data, the target device 102(1)-102(n) may conduct a real-time selection of one of the plurality of discrete advertising campaigns based on one or more of the identified opportunities, the accessed sensitive data, and/or the one or more of the plurality of sets of advertising competition rules. Upon selecting an advertising campaign, the target device 102(1)-102(n) may receive the targeted advertisement associated with the selected advertising campaign. As an example, the target device 102(1)-102(n) may send a request to the advertisement campaign provider system 104 or to a separate advertising server (e.g., content delivery server) to receive the targeted advertisement, and in response the advertisement campaign provider system 104 or other server may transmit the targeted advertisement associated with the selected advertising campaign. As another example, the target device 102(1)-102(n) may store a plurality of targeted advertisements associated with the selected advertising campaign on the target device 102(1)-102(n), and upon selection of the advertising campaign the target device 102(1)-102(n) may access a stored targeted advertisement on the target device 102(1)-102(n) associated with a selected advertising campaign.

AOD server 106, proxy server 112, database 110, target devices 102(1)-102(n), and advertising campaign provider system 104 may be configured to communicate with each other over network 108. Network 108 may comprise one or more types of computer networking arrangements configured to provide communications or exchange data, or both, between components of system 100. For example, network 108 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Network 108 may also include a public switched telephone network ("PSTN") and/or a wireless cellular network. Network 108 may be a secured network or unsecured network. In some embodiments, one or more components of system 100 may communicate directly through a dedicated communication link(s).

Target devices 102(1)-102(n) may be one or more computing devices configured to perform one or more operations consistent with the disclosed embodiments, as described more fully below. Target devices 102(1)-102(n) are devices that are targeted by AOD server 106 (or proxy server 112) to receive targeted advertisements. The advertisement selection, or campaign selection, may be performed by target devices 102(1)-102(n) themselves in real time based on sensitive or personal data associated with users of target devices 102(1)-102(n). FIG. 1 shows a plurality of target devices 102(1)-102(n) and each of the plurality of target devices 102(1)-102(n) may be associated with a user. Target devices 102(1)-102(n) may execute browsers or other application software that displays targeted advertisements on a display included in, or connected to, target devices 102(1)-102(n). Target devices 102(1)-102(n) may also store and execute other mobile applications that allow for integrated targeted advertisements. Target devices 102(1)-102(n) are further explained in detail below with reference to FIG. 5. The mobile applications may include web browser addons or plugins installed or integrated onto a web browser running on a smart phone or a computing device.

AOD server 106 may be one or more network-accessible computing devices configured to perform one or more operations consistent with the disclosed embodiments, as described more fully below. As discussed below, AOD server 106 may be a network device that stores advertising filtering rules, advertising competition rules, and/or advertising campaigns associated with targeted advertisements.

Advertisement competition rules stored in the AOD server 106 may include parameters such as a maximum, minimum, median, or optimum bid price that an advertising campaign is offering (e.g., for a particular ad, for a particular user demographic, etc.), a frequency cap of how many times a user is to be provided a same advertising campaign, demographic characteristics of where and to whom the advertisement is to be provided, behavioral characteristic of to whom the advertisement is to be provided, and various other parameters. In another example, as discussed further below, the advertisement competition rules may be stored on target devices 102(1)-102(n).

Advertising campaigns stored on AOD server 106 may include, or may be associated with, targeted advertisements. Advertising campaigns may be associated with advertisement competition rules. Advertising campaigns are further explained in detail below with reference to Table 1. Examples of advertisements include images (e.g., banner ads, wallpaper ads, pop-up ads, in-application ads, etc.), textual content (e.g., plain text, hyperlinks, etc.), videos (e.g., in-stream videos, reward videos, banner videos, etc.), audible sounds, or combinations of these forms of advertisement media.

The advertising filter rules are rules utilized by the AOD server 106 (or proxy server 112) to provide a set of advertising campaigns to a target device 102. As discussed further below, the advertising filter rules may be specific for each user, category of user, device, category of device, etc. that is transmitting an advertising campaign request. The AOD server 106 may generate advertising filter rules based on non-personal advertisement targeting data received in an advertising campaign request. By way of example, the non-personal advertisement targeting data received as part of an advertising campaign request may include a zip code, time information, an operating system, a network carrier, or other non-personal or non-sensitive data. The category of zip code may include a zip code for target devices 102(1)-102(n) (e.g., home address of the user stored as part of a user profile at a social networking website, based on their current or recent location), the category of operating system may include an operating system version or type of target devices 102(1)-102(n) (e.g., Android™, (OS™, Windows™, etc.), the category of network carrier may include a cellular network carrier of target devices 102(1)-102(n) (e.g., ATT™, Sprint™, Verizon™, T-Mobile™, etc.).

As an illustration, the received non-personal advertisement targeting data may include a location of the user based on a zip code for New York City, the network carrier of their device 102 (e.g., ATT™), the operating system and version of their device 102 (e.g., Android™), any various other non-personal advertisement targeting data. In this example, the categories of zip code, operating system, and network carrier data may be utilized by the AOD server 106 (or proxy server 112) to generate the advertising filter rules. The advertising filter rules may be used to filter the advertising campaigns based on zip code, operating system, and network carrier, among potentially other data, to select advertising campaigns that have targeted advertisements focused in or near the location of New York, that have targeted advertisements focused on users using the ATT™ network, that have targeted advertisements focused on Android™ devices, or a combination of these or other factors. The AOD server 106 may identify a set of advertising campaigns that satisfy the filter rules based on the received non-personal advertisement targeting data. The identified set of advertising campaigns may then be sent to the target devices 102(1)-102(n), as discussed further below.

Database 110 of system 100 may be communicatively coupled, directly or indirectly, to AOD server 106, proxy server 112, target devices 102(1)-102(n), and advertising campaign provider system 104 via network 108. Database 110 may include one or more memory devices that store information and are accessed and/or managed by one or more components of system 100. By way of example, database 110 may include Oracle™ databases, Sybase™ databases, or other relational databases or nonrelational databases, such as Hadoop sequence files, HBase, or Cassandra. Database 110 may include computing components (e.g., database operating system, network interface, etc.) configured to receive and process requests for data stored in memory devices of database 110 and to provide data from database 110.

Database 110 may be configured to store advertising filtering rules or parameters, advertising campaign rules or parameters, or potentially electronic advertisements themselves. These various types of rules and parameters are discussed further below. The rules or parameters for advertising filtering and advertising campaigns may be received by database 110 from AOD server 106, advertisement campaign provider system 104, or from an external source.

Proxy server 112, in some embodiments, may act as an intermediary server that communicates between the pool of target devices 102(1)-102(n) and the network 108, AOD server 106, and advertisement campaign provider system 104. Proxy server 112 may perform functions of intercepting or transmitting an advertisement campaign request, intercepting or receiving a first subset of discrete advertising campaigns, accessing sensitive data from the target device 102, conducting a real time selection of discrete advertising campaigns, receiving a targeted advertisement associated with a selected advertising campaigns, or transmitting the received targeted advertisement to the target device 102. In some embodiments, proxy server 112 is physically separate from target devices 102 (e.g., a separate server, gateway, etc.). In other embodiments, proxy server 112 may be an application or software agent integrated into target device 102 itself, and configured to monitor and intercept incoming or outgoing communications from target device 102.

Advertising campaign provider system 104 may be maintained by or associated with a sponsor of advertising campaigns. For example, such advertising sponsors may have advertisement platforms that are developed to target particular types of advertisements to particular user types, demographics, or target devices 102(1)-102(n). In some embodiments, advertising sponsors may maintain campaign rules which, as discussed further below, indicate particular advertising profiles, particular campaigns, particular advertisement types, particular costs or profits associated with advertisements, and other parameters. In some embodiments, advertising campaign provider system 104 may be associated with or operated by advertisement publishers themselves, such as online websites, retail stores, or other types of companies that seek to provide advertising that is targeted to target devices 102(1)-102(n). In those embodiments, the advertisement publishers may provide their own advertising profiles, campaigns, advertisement types, costs or profits associated with advertisements, and other parameters.

It is to be understood that the configuration of the functional blocks of system 100 as discussed above has been described herein for convenience of description. The components and arrangement of the components included in system 100 may vary. For example, in some embodiments, system 100 may include other components that perform or assist in the performance of one or more processes consistent with disclosed techniques for targeted advertisement or campaign selection. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
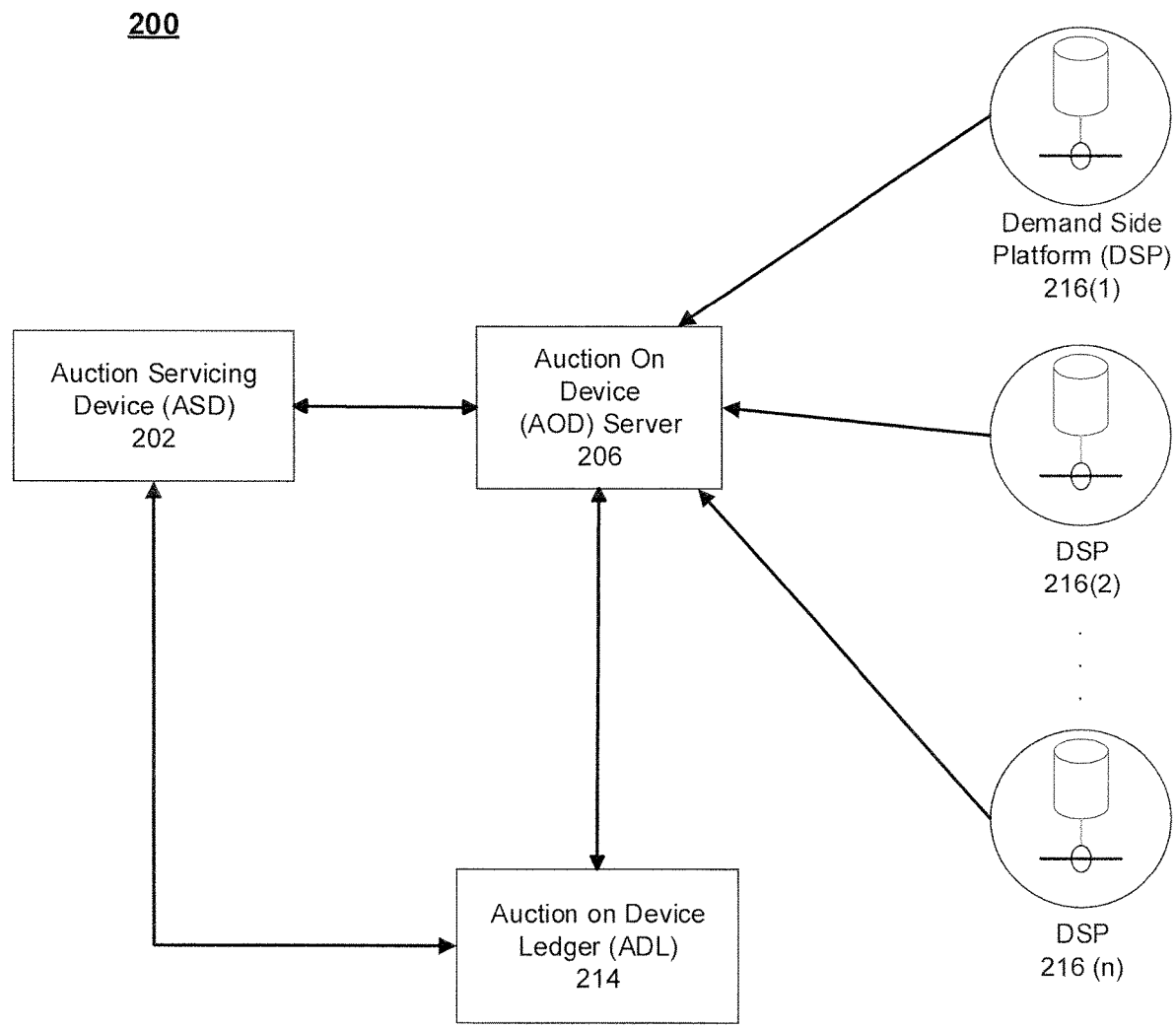
FIG. 2 is a block diagram of an exemplary advertising campaign filtering system, in accordance with disclosed embodiments.

FIG. 2 shows an exemplary configuration 200 of AOD server 106 in communication with auction servicing device (ASD) 202, auction on device ledger (ADL) 214, and a plurality of demand side platform (DSP) devices 216(1)-216(n). The DSP devices 216(1)-216(n) are network resources with software applications used to manage advertising in an automated fashion. DSP's 216(1)-216(n) may be used to buy ads, display ads, and search ads, as well as to serve and track ads. DSP's 216(1)-216(n) may be configured to manage the advertising inventory of one or multiple different advertisers. ASD 202 performs functions of servicing advertisements to the AOD server 206. For example, when a particular advertisement or campaign is selected, that selection may be reported to ASD 202. Similarly, other data may be reported to ASD 202 as well, such as particular advertisements displayed on user devices, user interactions with advertisements (e.g., views, clicks, downloads, purchases, etc.), time spent interacting with advertisements, frequency of advertisements being displayed to particular users, etc.

ADL 214 performs functions of a blockchain to store and process encrypted data between devices. For example, ADL 214 may track transactions such as those reported to ASD 202 (e.g., advertisements or campaigns selected, advertisements displayed, user interactions with advertisements, prices of advertisements, etc.). ADL 214 may also store the history of advertisement transactions, from the original advertiser all the way to a display instance (e.g., through the advertiser, to an advertisement agency, to a DSP 216, to a supply-side platform (SSP), to a particular publisher (e.g., website or application), to a particular end user). By maintaining this transaction data in ADL 214, the data may be verifiable by participants in the advertisement ecosystem of system 200. In some embodiments, the transaction data maintained by ADL 214 is stored in encrypted form. Accordingly, only the entities participating in transactions (e.g., advertisers, publishers, etc.) will be able to decrypt the transaction records.

Consistent with the embodiments below, DSP's 216(1)-216(n) may provide campaign logic or code, which represents the decision-making criteria for selecting a particular targeted advertisement, or selecting a particular targeted advertisement and corresponding advertisement price. The logic or code may account for parameters such as particular user traits or demographics, particular device attributes, advertisement price attributes, and more. DSP's 216(1)-216(n) may provide the advertisement code or logic to AOD server 206. As discussed further below, AOD server 206 may perform a filtering operation on the universe of advertisement logic or code it maintains, in order to select a smaller set of one or more campaign rules that are relevant to a particular user or device. That smaller set of rules may then be transmitted to the device for use by the device in real-time advertisement or campaign selection. Notably, in accordance with FIG. 2, while users' personal or sensitive data may be used in the advertisement or campaign selection locally on their device, that data need not leave their device. Thus, the privacy of that data may be maintained. Similarly, while advertisers and advertisement servicing entities may have their own unique rules and code used for advertisement selection and pricing (e.g., as provided by DSP's 216(1)-216(n)), that data may be securely handled as well and not shared with other advertisers.

Figure 3:
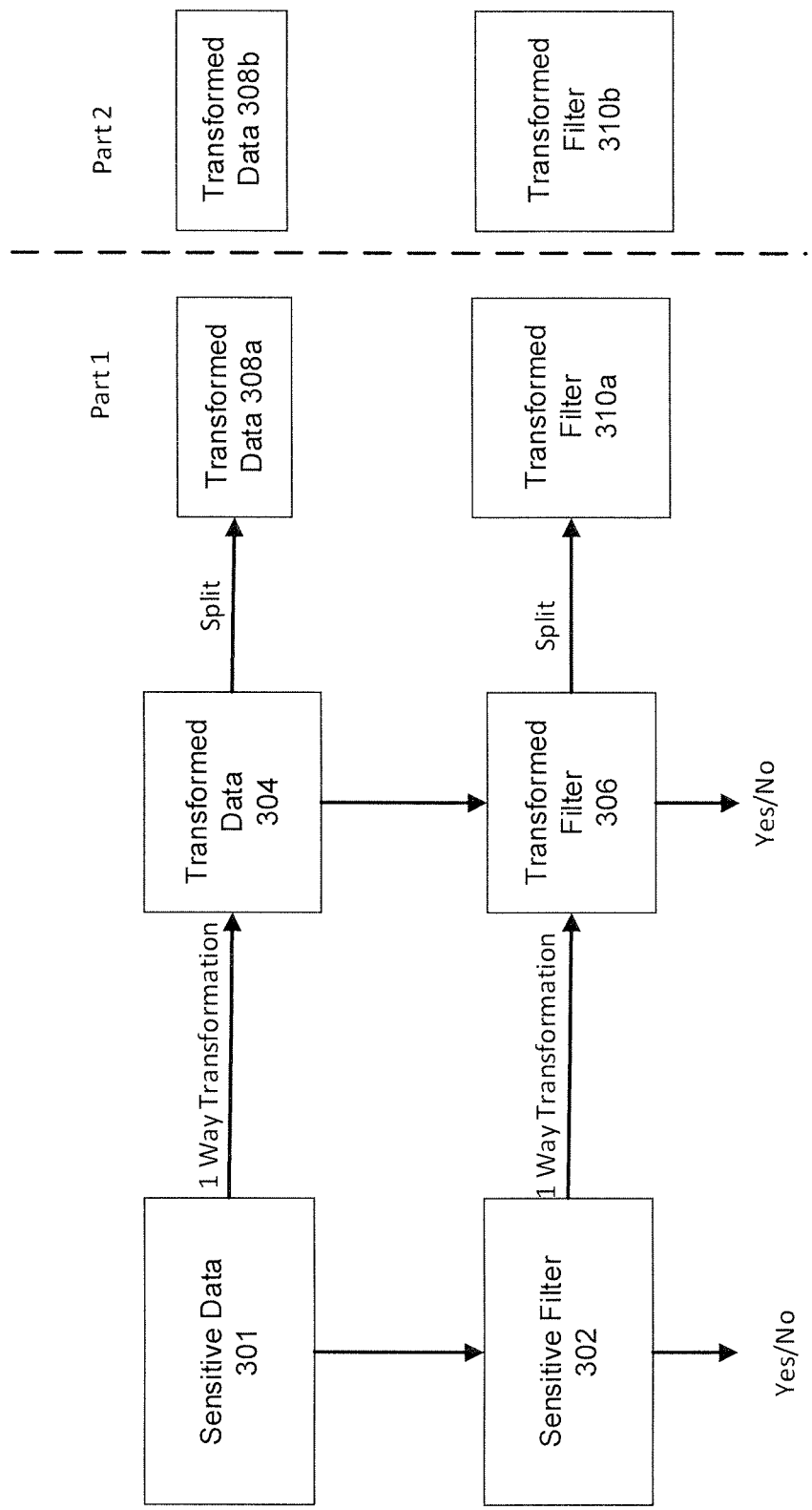
FIG. 3 is a block diagram showing an exemplary data transformation or filtering technique, in accordance with disclosed embodiments.

FIG. 3 shows an exemplary data flow configuration 300 for filtering data (e.g., campaign rules or logic) at AOD server 106. The AOD server 106 may, for example, transform advertising campaign criteria or parameters into bit arrays and then split the criteria or parameters into sensitive campaign data and non-sensitive data to keep sensitive advertising campaigns rules private from other devices to perform real-time selection of advertisements, as explained further below with reference to FIGS. 4 and 10.

In accordance with FIG. 3, AOD server 106 may potentially store hundreds, or even millions of individual advertising campaign rules, each having its own user or device targeting criteria (e.g., based on demographics, user data, user preferences, etc.) and pricing information (e.g., defining how much an advertiser will pay for a particular advertising opportunity). Because storage and processing capabilities on user devices are limited, and bandwidth between AOD server 106 and the user devices is also limited, AOD server 106 may advantageously perform filtering of the campaign rules it stores, and send only a subset (e.g., one or several) to the user device for use in an advertisement or campaign selection to be performed locally by the device.

As shown in FIG. 3, sensitive data 301 may be provided to sensitive filter 302. As discussed above, the sensitive data 301 may include data that is relevant to advertising campaigns maintained on AOD server 106. Stated differently, advertising campaigns on AOD server 106 may include one or more selection attributes matching sensitive data 301. Sensitive data 301 may be, for example, zip code, device ID, time, user interests, user preferences, user applications, or various other types of data associated with a user or their device that may be used in targeting advertisements. As discussed further below, sensitive data 301 may be transformed (e.g., via a one-way transformation) into transformed data 304. The transformation may be a lossy transformation, such that the data 301 cannot be transformed back into its original form exactly. Transformed filter 306 may receive and filter the transformed data 304. The transformed data 304 may be separated into two parts, transformed data 308a and transformed data 308b. Similarly, the transformed filter 306 may also be split into two filters, transformed filter 310a and transformed filter 310b. Each of transformed filter 310a and transformed filter 310b may process their corresponding part of the data (part 308a or 308b). As discussed further below, the filters (e.g., transformed filter 310a and transformed filter 310b) may be bit vectors and the data itself may be sets of indexes fed into the bit vectors. The filtering operation may include matching the sets of indexes to the bit vectors. Additional details regarding the filtering are discussed below in connection with FIGS. 4 and 10.

Figure 4:
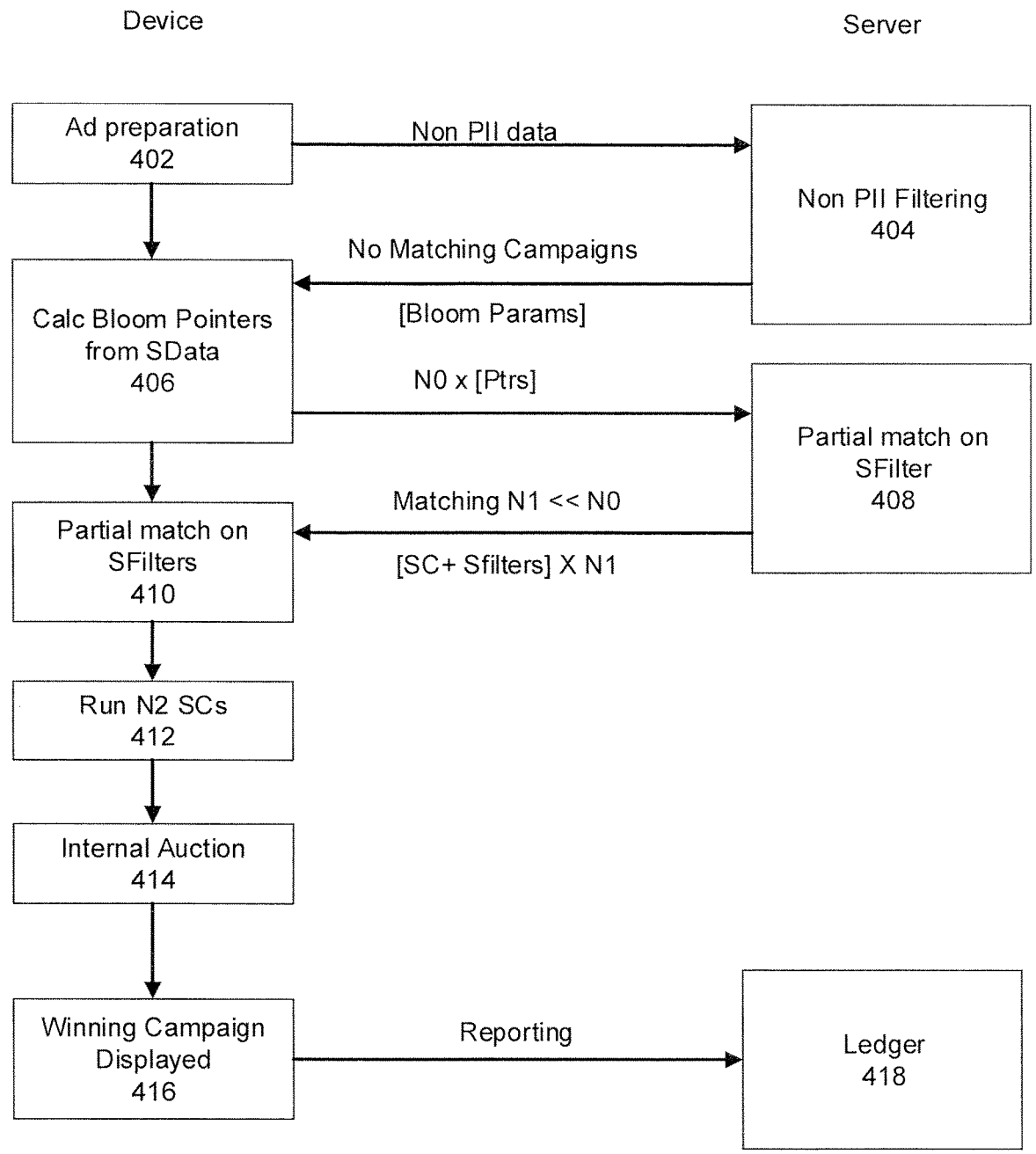
FIG. 4 is a block diagram depicting an exemplary advertisement selection data flow, in accordance with disclosed embodiments.

FIG. 4 shows an exemplary data flow configuration 400 for interactions between user devices 102 (e.g., target devices 102) and an advertisement management server (e.g., AOD server 106). The user device may prepare for receiving an advertisement in an operation 402. This may involve, for example, requesting or downloading a web page with an advertisement area or pointer. Further, this may involve interacting with an application that involves integrated advertisements. In some embodiments, advertisement preparation operation 402 includes detecting the advertising opportunity before an advertisement request is generated, while in other embodiments operation 402 is performed after (e.g., as part of) an advertisement request by the device.

The user's device may transmit non-personally identifying (PII) data to the server. As discussed above, the non-PII data may include information such as the user's country, zip code, device type, cellular network carrier, operating system type, time, geolocation, etc. Consistent with the techniques below, this non-PII data may be used in a two-step filtering process. The first step may involve the AOD server using the non-PII data to perform a first filtering, to select only advertising campaigns potentially relevant to the user based on their non-PII data. In some cases, this first type of filtering may greatly reduce or limit the universe of potential advertisements from which to further filter, according the second filtering step discussed further below.

In operation 404, the server (e.g., AOD server 106) may perform the first type of filtering by filtering available campaigns based on the received non-PII data. For example, when the non-PII data received includes a user location of Texas, USA, the filtering criteria may be providing adverting campaigns that are targeted to the location of Texas, USA (advertising competition rule), although any number of non-PII data may also be used for performing the filtering. The AOD server 106 may filter the plurality of advertising campaigns 516, as discussed further below, based on providing advertising campaigns in the targeted location of Texas, USA. The AOD server 106 then may generate a first subset of the advertising campaigns, which includes advertising campaigns that meet the advertising competition rules of being targeted in the location of Texas, USA. The server may also maintain sets of private advertising competition rules associated with discrete advertising campaigns. The private advertisement competition rules stored in the server may include a variety of parameters, such as network carrier, maximum bid price that an advertisement or advertising campaign is offering, a frequency cap of how many times a user is to be provided a same advertisement or advertising campaign, demographic characteristics of where and to whom the advertisement is to be provided, behavioral characteristics of to whom the advertisement is to be provided, device operating system version, etc.

From the first subset of the advertising campaigns, the AOD server 106 then may determine advertising sensitive criteria associated with each of advertising campaigns in the first subset of the advertising campaigns. By way of example, an advertising campaign may have an advertising sensitive criteria of targeting advertisement towards high income users (e.g., provide advertising campaigns to users with salary of $150,000/year or higher) or users with higher educational qualification (e.g., provide advertising campaigns to users with an post-doctoral degree or higher). Various other possible types of advertising sensitive criteria may be used in specific implementations. Based on the advertising sensitive criteria associated with each of the advertising campaigns in the first subset of the advertising campaigns, the AOD server 106 may create bloom parameters.

In an example, the first subset of the advertising campaigns includes an advertising campaign 1, an advertising campaign 2 and an advertising campaign 3. The AOD server 106 may transmit the created bloom parameters associated with each of the advertising campaigns to the user device 102. The AOD server 106 may transmit the bloom parameters and the advertising criteria associated with each of the advertising campaigns 1, 2, and 3 to the user device 102. For example, AOD server 106 may transmit the advertising criteria associated with advertising campaign 1 (e.g., income associated with user), advertising criteria associated with advertising campaign 2 (e.g., educational qualification of the user), and advertising criteria associated with advertising campaign 3 (e.g., income associated with user).

In operation 406, upon receiving the bloom parameters and the advertising criteria, the user device 102 may generate a bloom filter as well as a pointer associated with each of the advertising campaigns in the first subset of advertising campaigns. The user device 102 may utilize the received advertising criteria (e.g., an income associated with user and educational qualification of the user) to select the sensitive data that is to be transformed. In this example, the user sensitive data corresponding to the received advertising criteria may be $170,000/year and bachelor's degree, this sensitive data stored on the user device 102 is transformed to generate a bloom filter, although any another type of filter, such as a lossy filter, bit array filter may also be generated. The parameters generated of the bloom filters correspond to the received bloom parameters. The bloom filter is a bit array of data, and this bit array of data may then be split into two parts (e.g., part 1 and part 2, as explained with reference to FIG. 3 steps 304, 306, 308 and 310, and further explained below). Further, by way of example, the user device 102 may generate M number of pointers for the generated bloom filters based on the bloom parameters. The user device 102, upon generating the bloom filter, may generate M number of pointers associated with each of the bloom filters. In this example, a first part of the bit array is associated with the N0 number of pointers, and the second part of the bit array is associated with the remaining portion of the M pointers, i.e., N0–M pointers. The bloom filter may have a pre-defined false-positive error epsilon to be of a smallest desired value. In this example, the bloom filter may be a bit array based on the bloom parameters associated with advertising campaign 1, advertising campaign 2, and advertising campaign 3, i.e., the bloom filter generated may be a bit array for an income associated with user and educational qualification of the user.

In order to keep the user's sensitive data private and secure and on the user device 102, the user device 102 may then transmit the N0 pointers to the AOD server 106. In operation 408, the server may then utilize the received N0 pointers to determine whether the sensitive data associated with the user device 102 matches with the campaign sensitive filter stored at the server. The campaign sensitive filter stored at the server may be filters created by the server for the advertising sensitive criteria stored at the server. By way of example, the server may determine if the N0 pointer that points to the sensitive data of $170,000/year and bachelor's degree associated with the user of the device matches with the campaign sensitive filter associated with advertising sensitive criteria of providing advertising campaigns to users with salary of $150,000/year associated with advertising campaign 1 and advertising campaign 3, and provide advertising campaigns to users with a post-doctoral degree associated with advertising campaign 2.

If the server determines that there is no match, e.g., in this example, as the advertising campaign 2 does not satisfy the criteria of providing advertisements to users with post-doctoral degree, as the educational qualification associated with the user of the user device 102 is bachelor's degree, then in this scenario the server filters out the advertising campaign 2.

If the server determines that there is a match, e.g., in this example, the advertising campaign 1 and advertising campaigns 3 satisfy the criteria of $150,000 of user income, as the users income is $170,000, then upon the match based on the partial information received from pointers associated with the first part of the sensitive data, the server would proceed to confirm if the match is correct, based on matching with the remaining portion of the sensitive data. The server may then transmit only the remaining N0–M pointers of the M pointers to the user device 102.

In operation 410, the personal computing device 102 may perform a comparison to determine if the second portion (part 2) of the transformed data partially matches with the N0–M pointers received from the personal computing device 102. When the personal computing device 102 determines that there is a match, then the personal computing device 102 may select the advertisement campaigns 1 and 3 corresponding to the advertiser data.

In operation 412, the personal computing device 102 may run internal bidding logic for the filtered and matching advertising campaigns 1 and 3, as discussed above, to initiate an internal selection process to select an advertisement campaign based on various user sensitive data stored on the personal computing device 102. In response to the bidding logic, the device may determine a bid price associated with the advertising campaigns 1 and 3. By way of example, the bid price for advertising campaign 1 may be $1 and the bid price for advertising campaign 3 may be $3.50, although any other monetary value may be associated with the bid price. In operation 414 the user device 102 performs the internal auction or selection to identify a winning advertisement campaign as part of a real time selection of a targeted advertisement campaign. In this example, the device 102 may identify advertising campaign 3 as the highest bidding price campaign, and select advertising campaign 3 as the winning campaign. The process of real time selection of a targeted advertisement campaign is further explained below with reference to FIG. 7.

In operation 416, the personal computing device 102 may display the winning advertisement campaign on an application running on the personal computing device 102 (e.g., via display 508, as discussed in connection with FIG. 5, below). In operation 418, the personal computing device 102 reports to a ledger server or node 418 (e.g., ADL 214, as discussed above), which advertisement or campaign was selected as a winning advertisement or campaign. The device 102 also may report the winning campaign and settlement price, all participating campaigns in the auction, other non-sensitive data for the winning campaign/participating campaigns, etc. The ledger server or node 418 may keep track of the advertisement campaigns selected and provided to the personal computing device 102.

An alternative embodiment of operations 404-408 are explained here. In operation 404, after identifying the first subset of advertising campaigns (explained above), the AOD server 106 may generate a campaign sensitive filter as well as a pointer for advertiser sensitive data (each of the advertising criteria) associated with the advertising campaigns in the first subset of advertising campaigns. The AOD server 106 generates the campaign sensitive filters by transforming advertiser sensitive data associated with the advertising campaign and creates a pointer for each of the advertising campaigns. Further, the AOD server 106 may transmit the pointers along with the created bloom parameters to the user device 102. The bloom filter may be a bit array of data, and this bit array of data may then be split into two parts. By way of example, the AOD server 106 may generate L number of pointers for the generated campaign sensitive filters. The AOD server 106, upon generating the campaign sensitive filter, may generate L number of pointers associated with each of the campaign sensitive filters. In this example, a first part of the bit array is associated with the P0 number of pointers, and the second part of the bit array is associated with the remaining portion of the L pointers, i.e., P0–L pointers. In order to keep the advertiser sensitive data (advertising criteria) private and secure and on the AOD server 106, the AOD server 106 may then transmit the P0 pointers to the user device 102.

In operation 406, the user device 102 may then utilize the received P0 pointers to identify the sensitive data corresponding to the advertiser sensitive data associated with the received pointer as well as bloom parameters. The user device 102 may then utilize the received P0 pointers to determine the advertising criteria. By way of example, the user device 102 may determine that the P0 pointer associated with advertising campaigns points to the advertiser sensitive data of targeting advertisement towards high income users (e.g., provide advertising campaigns to users with salary of $150,000/year) or users with higher educational qualification (e.g., provide advertising campaigns to users with a post-doctoral degree or higher). Accordingly, the user device 102 may determine the advertiser sensitive criteria that corresponds to the received P0 pointers. Upon determining the advertiser sensitive criteria, the user device 102 then determines the user sensitive data that corresponds to the advertiser sensitive criteria. By way of example, the user device 102 may determine the P0 pointer that points to the advertiser sensitive data of $150,000/year associated with advertising campaign 1 and advertising campaign 3, and further for advertising campaign 2 the advertiser sensitive data is a post-doctoral degree associated with a user. The user device 102 may then create bloom filters based on the received bloom parameters as explained above in operation 406.

In operation 406, upon determining the match based on the partial information received from pointers P0 associated with the first part of the advertiser sensitive data, the user device 102 may proceed to confirm if the match is correct, based on matching with the remaining portion of the advertiser sensitive data. The user device 102 may then transmit only the remaining P0–L pointers of the L pointers to the AOD server 106. The user device 102 may transmit N0 pointers (as explained earlier) as well as P0–L pointers to the AOD server 106.

Upon receiving the P0–L pointers the AOD server 106 may perform a comparison to determine if the second portion (part 2) of the transformed data partially matches with the P0–L pointers. When the AOD server 106 determines that there is a match then AOD server 106 successfully determines that the advertiser sensitive data is identified correctly by the user device 102 and may further proceed to perform matching of the received N0 pointers as explained above. Thus, by not transmitting the advertiser sensitive data to the user device 102, the advertiser sensitive data remains secure and private at the AOD server 106, which provides enhanced security for advertisers' data.

Figure 5:
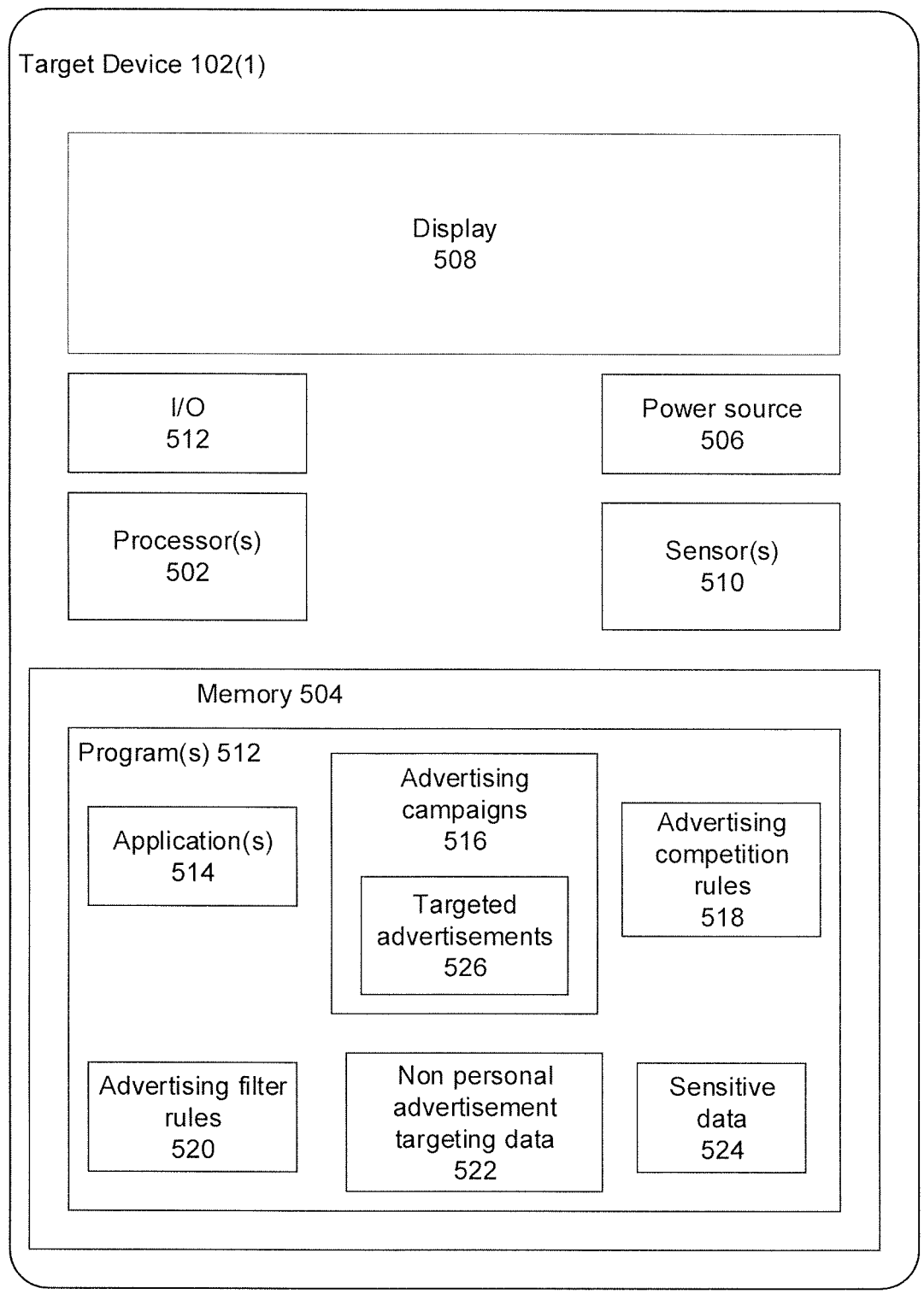
FIG. 5 is a block diagram of an exemplary target device for participating in a selection of targeted advertisements, in accordance with disclosed embodiments.

FIG. 5 shows an exemplary configuration 500 of target devices 102(1)-102(n), such as those discussed above in connection with FIG. 1. Examples of target device 102(1) may be a handheld device (e.g., a mobile phone, a smart phone, a tablet or a notebook), a personal computer (a desktop or a laptop), a wearable device (e.g., a smart watch, smart jewelry, an implantable device, a fitness tracker, smart clothing, a head-mounted display, etc.), an IoT device (e.g., smart home devices, industrial devices, etc.), an environmental display (e.g., wall panel, billboard, etc.), or various other types of devices capable of processing and/or receiving data, or any mobile or wearable device with computing ability, or any combination of these computers and/or affiliated components.

Target device 102(1) may enable a user to perform interactions or transactions with applications 514 stored on memory 504, which may include for example viewing webpages, scrolling through web pages, clicking on Uniform Resource Locators (URL's), downloading data or other content, installing or opening applications, or more. Applications 514 may be internet browsers, social media applications, search engine applications, news applications, gaming applications, or various other types of applications.

Target device 102(1) may include one or more processors 502 configured to execute software instructions stored in memory, such as a memory 504. The processor 502 also performs functions of a graphics processing unit (GPU). Memory 504 may store one or more software programs 512 that when executed by processor 502 perform Internet-based or other network-based communications, content display processes, and other interactive processes for users of target device 102(1). For instance, target device 102(1) may execute a browser or related mobile display software (e.g., as applications 514) that generates and displays interfaces including content on a display 508 included in, or in communication with, target device 102(1). Target device 102(1) may be a mobile device that executes mobile device applications and/or mobile device communication software, included in programs 512, that allows target device 102(1) to communicate with AOD server 106 and other components via network 108, to generate and display content in interfaces via display 508. Additionally, target device 102(1) may include a power source 506 (e.g., local battery, DC power supply, etc.). The disclosed embodiments are not limited to any particular configuration of target device 102(1). As such, target device 102(1) may include fewer or more components compared to those of FIG. 5.

Target device 102(1) may be configured to store, in memory 504, one or more operating systems that perform operating system functions when executed by processor 502. By way of example, the operating systems may include Microsoft Windows™, Unix™, Linux™, Android™, Apple™ Mac OS operating systems, iOS, Chrome OS, or other types of operating systems. Accordingly, disclosed embodiments may operate and function with computer systems running any type of operating system. Target device 102(1) may also include communication software stored in memory 504 that, when executed by processor 502, enables communications with network 108, such as Internet Protocol (IP) communications, local area network (LAN) communications, or other types of network communications.

Display 508 may include, for example, a liquid crystal display (LCD), a light emitting diode display (LED), an organic light emitting diode screen (OLED), a touch screen, and various other types of display devices. Display 508 may display various information to user. For example, display 508 may display an interactive interface to the user enabling the user to operate target device 102(1) to perform certain aspects of the disclosed methods. Display 508 may display touchable or selectable options for the user to select and may receive user selections of options through a touch screen, stylus input, keyboard input, or other types of user input.

Target device 102(1) may include one or more sensors 510, including but not limited to a global positioning system (GPS) module, other location such as a Global Navigation Satellite System (GNSS) module, accelerometer, motion sensor, inertial sensor, gyroscope, pressure sensor, image or light sensor, proximity sensor, or various other types of sensors. The data collected by one or more of sensors 510 may be used to determine the location of a user or their device 102(1). In some embodiments, any combination of these sensors may be used to determine a position of target device 102(1) associated with user.

Target device 102(1) may also include I/O devices 512 that allow target device 102(1) to send and receive information or interact with the user or other devices. For example, I/O devices 512 may include various input/output devices, such as a keyboard, a mouse-type device, a gesture sensor, an action sensor, a physical button, a switch, a microphone, a touchscreen panel, a stylus, etc., that may be manipulated by the user to input information using target device 102(1). I/O devices 512 may also include an audio output device, such as a speaker configured to provide sound and audio feedback to the user operating target device 102(1). I/O devices 212 may also include one or more communication modules (not shown) for sending and receiving information from other components in system 100 by, for example, establishing wired or wireless connectivity between target device 102(1) and network 108. I/O devices 512 may include radio frequency, infrared, or other near-field communication interfaces, for communicating with other devices associated with network 108 or the user. Exemplary communication modules of I/O devices 512 may include, for example, a short-range or near field wireless communication modem, a Wi-Fi™ communication modem, or a cellular communication modem. I/O devices 512 may include a transceiver or transmitter configured to communicate using one or more wireless technologies/protocols that may include, without limitation, cellular (e.g., 3G, 4G, 5G, etc.) technology, Wi-Fi™ hotspot technology, RFID, near-field communication (NFC) or Bluetooth® technologies, etc.

Programs 512 of the target device 102(1) may include applications 514, advertising campaign data 516 (e.g., as received from AOD server 106), targeted advertisements 526 (e.g., cached for future use), advertisement competition rules 518 (e.g., as received from AOD server 106), advertising filter rules 520 (e.g., as received from AOD server 106), non-personal advertisement targeting data 522, and advertiser sensitive data 524, among other types of data. These types of data are further discussed below.

Advertising campaigns 516 may include, or be defined by, advertising competition rules 518, which in turn may be associated with one or more targeted advertisements 526. The advertising competition rules 518 may include a variety of parameters that target device 102(1) may use to select a targeted advertisement 526 or advertising campaign 516, such as bid price, frequency cap, demographic characteristics, behavioral characteristics, or various other types of parameters as discussed above. Targeted advertisements 526 may include various types of electronic advertisements, such as image or video-based banners, wallpapers, pop-ups, integrated content, or various other types of advertisements.

Advertising filter rules 520 may include rules that determine what data (e.g., non-sensitive or non-PII data) to send from target device 102(1) to AOD server 106 so that AOD server 106 can filter among available advertising campaign rules and send a subset (e.g., one or several) to target device 102(1). Consistent with the discussion above, the filtering by AOD server 106 may be based on data such as country, zip code, operating system, or network carrier, among others, to select advertising campaigns that have targeted advertisements. Non-personal (e.g., non-sensitive or non-PII) advertisement targeting data 522 may include, by way of example, data such as zip code, operating system, network carrier, etc. Sensitive or PII data 524, on the other hand, may include data such as a user's date of birth, personal preferences, social media data, interactions with applications, search engine usage, demographic data, etc.

Figure 6:
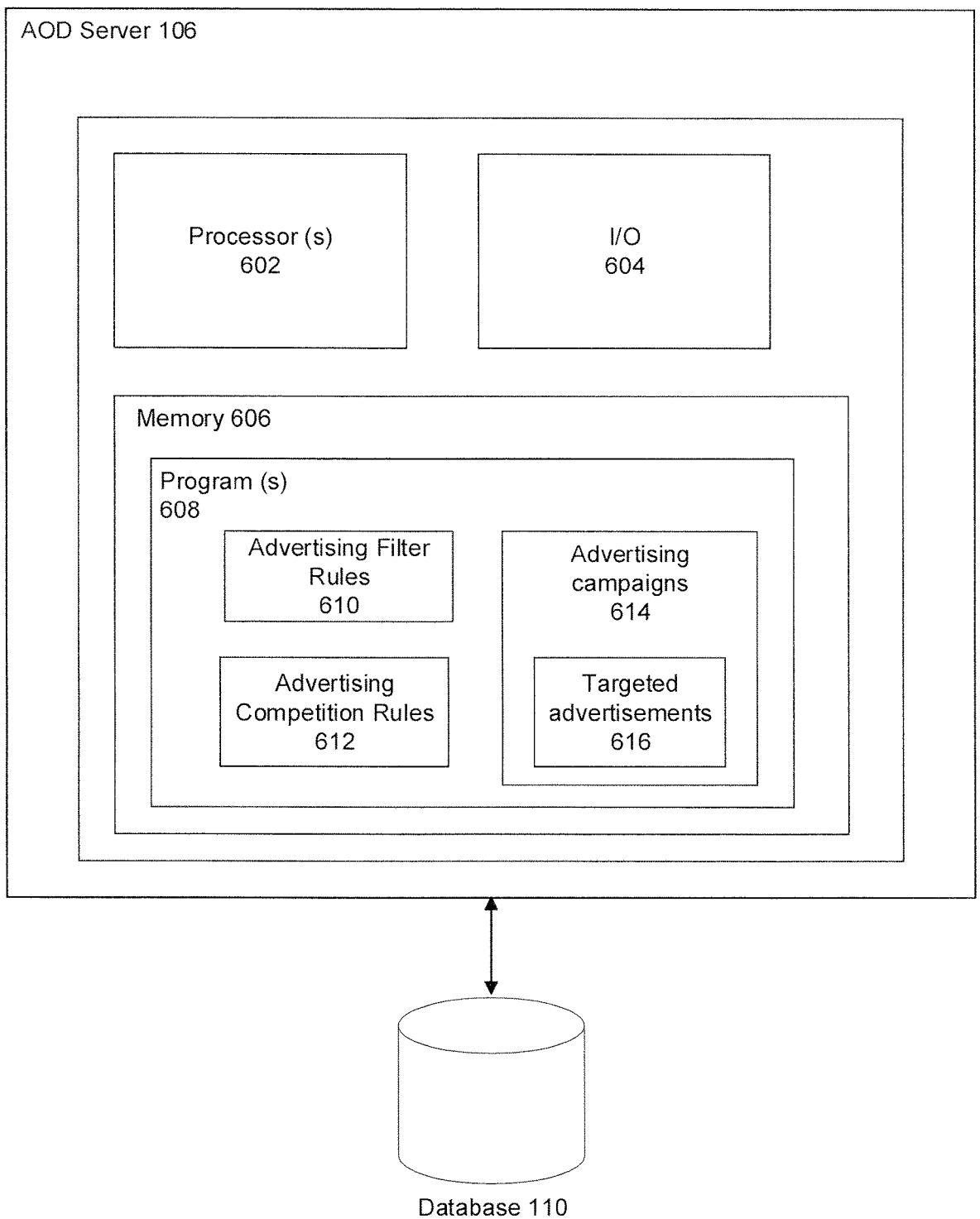
FIG. 6 is a block diagram of an exemplary advertisement targeting server, consistent with disclosed embodiments.

FIG. 6 shows a system 600 depicting an exemplary AOD server 106 consistent with the disclosed embodiments. Variations of AOD server 106 may constitute one or more components of advertising campaign provider system 104, proxy server 112, database 110, and/or target devices 102(1)-102(n). In some embodiments, AOD server 106 includes one or more processors 602, one or more input/output (I/O) devices 604, and one or more memories 606. AOD server 106 may be configured as an apparatus, embedded system, dedicated circuit, or the like based on the storage, execution, and/or implementation of software instructions that perform one or more operations consistent with the disclosed embodiments.

Processor 602 may include one or more processing devices, such as a microprocessor from the Pentium™ or Xeon™ family manufactured by Intel™, or the Turion™ family manufactured by AMD™, for example. The disclosed embodiments are not limited to any particular type of processor(s) otherwise configured to meet the computing demands required of different components of system 600.

Memory 606 may include one or more storage devices configured to store instructions used by processor 602 to perform functions related to disclosed embodiments. For example, memory 606 may be configured with one or more software instructions, such as program(s) 608 that may perform one or more operations when executed by processor 602. The disclosed embodiments are not limited to separate programs or computers configured to perform dedicated tasks. For example, memory 606 may include a single program 608 that performs the functions of system 106, or program 608 may comprise multiple programs. These sets of instructions may be executed by processor 602 to perform communication and/or processes consistent with disclosed embodiments.

The programs 608 and associated data may include an advertising campaigns application and data 614, targeted advertisements application and data 616, advertising filter rules and data 610, and advertisement competition rules and data 612. These applications and their associated data are discussed below.

Advertising filter rules 610 may include parameters for filtering the available advertising campaigns 614 based on non-sensitive or non-PII data, consistent with the techniques discussed above in connection with FIGS. 3 and 4. For example, advertising filter rules 610 may filter the available set of advertising competition rules 612 to just one or a limited subset based on characteristics of personal computing devices such as zip code, operating system, network carrier, and other non-PII data to select advertising competition rules 612 that are to be transmitted to personal computing devices.

Advertising campaigns application and data 614 may include targeted advertisements 616. As discussed above, targeted advertisements 616 may include various types of electronic advertisements, such as images, videos, sounds, etc. In alternate embodiments, targeted advertisements 616 are stored separate from system 100 (e.g., at a separate content server or content delivery network). Targeted advertisements 616 may be based on advertising campaigns 614 that are targeted to subject matter such as, for example, football and basketball (e.g., retailers selling merchandize associated with football and basketball), musicians like Beyoncé and Justine Bieber (e.g., tickets for concerts of Beyoncé and Justine Bieber taking place in or near a particular location). The advertising competition rules 612 may include various parameters used for the selection of particular advertisements or campaigns, such as bid price, frequency cap, demographic characteristics, behavioral characteristics, and various other parameters.

AOD Server 106 may also be communicatively coupled to one or more database(s) 110. As discussed above, AOD server 106 may include database 110. Alternatively, database 110 may be located remotely from AOD server 106 and AOD server 106 may be communicatively coupled to database 110 through network 108. Some or all of advertising filter rules 610, advertising competition rules 612, advertising campaigns 614, or targeted advertisements 616 may be stored in database 110.

Figure 7:
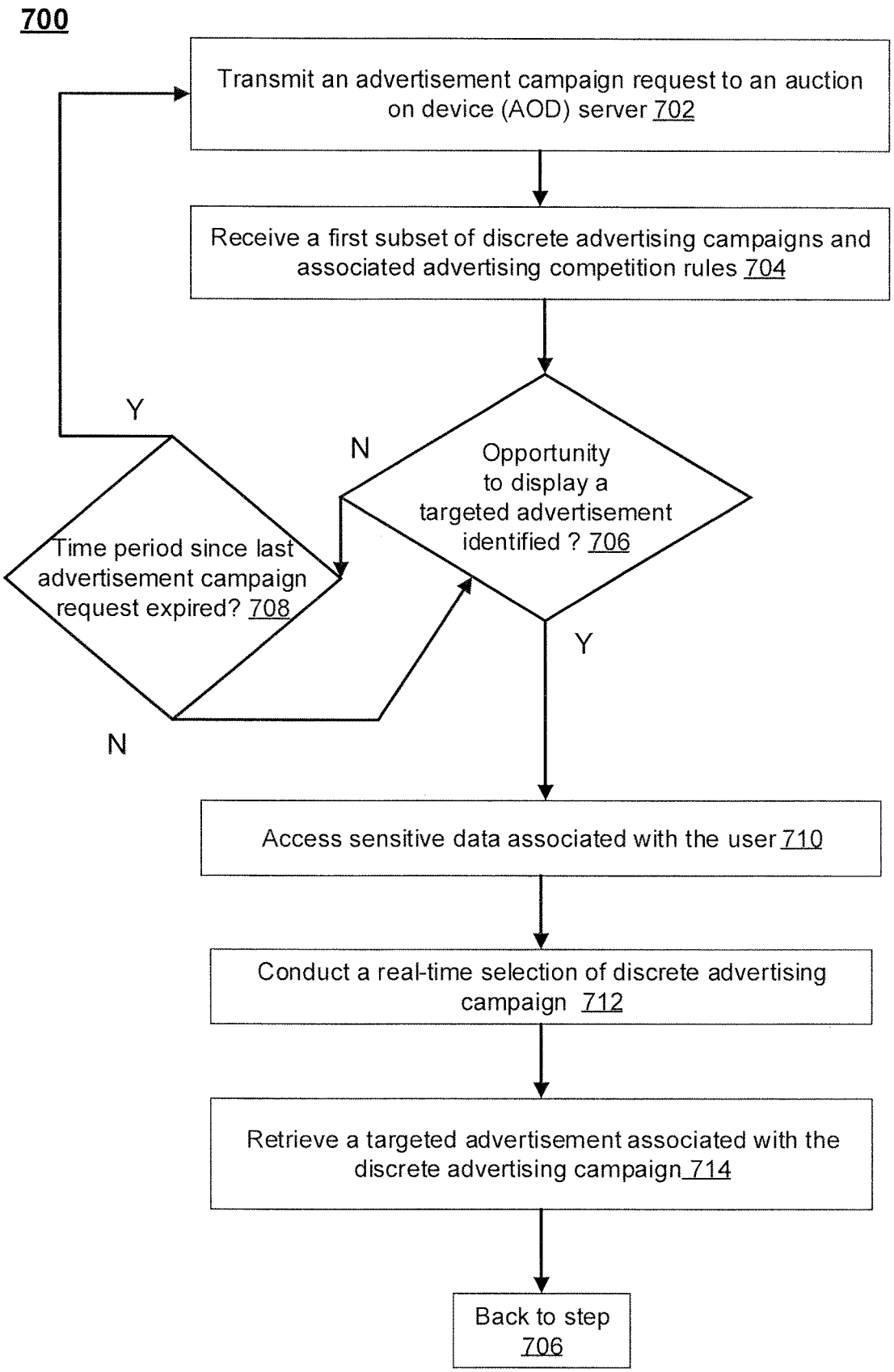
FIG. 7 is a flowchart depicting an exemplary process of a real-time selection of targeted advertisements while maintaining user data privacy, in accordance with disclosed embodiments.

FIG. 7 shows a flowchart of an exemplary process 700 depicting a real-time selection of targeted advertisements by target devices 102(1)-102(n) while maintaining user data privacy and advertiser data privacy, consistent with the disclosed embodiments. In certain aspects, a target device 102 may be configured to execute software instructions that perform one or more of the operations of process 700. Alternatively, aspects of process 700 may be performed by proxy server 112.

At step 702, process 700 discloses personal computing device 102 transmitting an advertising campaign request to an auction on device (AOD) server 106. The advertising campaign request may be generated by one of the applications 514 stored in the memory 504, consistent with FIG. 5 above. The application 514 may be a software application or agent pre-installed on the personal computing device 102 and pre-programmed to generate an advertising campaign request at defined times. For example, the advertising campaign request may be automatically transmitted when a user interacts with an application that allows for targeted advertisements (e.g., web browser on a computer, web browser on a smart phone device or other application). Further, the advertising campaign request may be automatically transmitted upon the user logging into their device 102 or unlocking their device 102. In further embodiments, the advertising campaign request may be generated when a user downloads a particular web page or interacts with an application that has an embedded or integrated advertising element or placeholder. The advertising campaign request may include one or more non-personal (e.g., non-PII) advertisement targeting data 522 associated with a user of personal computing device 102. The non-personal advertisement targeting data 522 may be stored in memory 504 of the personal computing device 102, as discussed in connection with FIG. 5. The non-personal advertisement targeting data 522 associated with a user may include information such as zip code, operating system, interests, network carrier, etc. Consistent with the above discussion regarding FIG. 6, AOD server 106 may then filter available advertising campaigns based on the transmitted non-personal advertisement targeting data 522.

At step 704, the personal computing device 102 may receive a first subset of discrete advertising campaigns. The first subset of discrete advertising campaigns may be selected by the AOD server 106 from a group of available advertising campaigns using advertising filtering rules 610 stored on AOD server 106. The filtering process used by AOD server 106 may utilize advertising filtering rules 610 and the transmitted non-personal advertisement targeting data 522. Each of the selected advertising campaigns may be associated with advertising competition rules 518, which can be received at the personal computing device 102 in operation 704. In this example, the filtered and selected advertisement competition rules 518 are received from AOD server 106, and then stored (at least temporarily) at personal computing device 102. Advertising competition rules 518 may be configured by advertisers associated with the advertisement campaign provider system 104 or the AOD server 106 itself. Advertising competition rules 518 are further explained below with reference to Table 1.

At step 706, personal computing device 102 determines if an opportunity to display a targeted advertisement on display 502 is identified. While process 700 depicts operation 706 as occurring after operations 702 and 704, in some embodiments operation 704 may occur before operations 702 and 704. For example, after an advertising opportunity is identified in operation 704, the request for an advertising campaign in operation 702 may be performed. Identifying an opportunity to display a targeted advertisement may be performed by one of the applications 512 that may be pre-installed on the personal computing device 102. Identifying an advertising opportunity may be performed in response to user interaction with one or more of the software applications running on personal computing device 102 (e.g., browser or other application). As an example, the user interaction may include a user clicking on a uniform resource locator (URL) of a web page while accessing a browser application running on personal computing device 102. When personal computing device 102 identifies that the user has clicked on the URL, personal computing device 102 may identify this action to be an opportunity to display a targeted advertisement and the method proceeds to step 710. By way of further example, the user interaction may also include actually requesting or downloading a particular web page, detecting a real time location of the user device (e.g., detecting that a user has entered a shopping mall or other location), a location of the user (e.g., the zip code associated with the user's home address stored as part of a user profile at a social networking website), opening a browser application on personal computing device 102, accessing a payment screen to purchase a product, logging in or unlocking personal computing device 102, or various other forms of user interaction.

If in step 706 personal computing device 102 determines that an opportunity to display a targeted advertisement is not identified, then the method may in some embodiments proceed to step 708. In step 708, personal computing device 102 may determine whether a time period since a last advertising campaign request transmitted in step 702 has expired. The time period may include, for example, 1 hour, 10 hours, 24 hours, etc. When personal computing device 102 determines that the time period has expired in operation 708, then the method loops back to step 702 and if personal computing device 102 determines that the time period has not expired, then the method proceeds to step 706 to determine if an opportunity to display a targeted advertisement has been identified.

At step 710, personal computing device 102 accesses sensitive data 524 associated with the user, which may be stored on personal computing device 102. Sensitive data 524, as discussed above, may include a user's personal information such as a specific location (e.g., address or point-of-interest), a specific subject matter of interest of the user, when and how many times the user has been provided a targeted advertisement campaign, age, birth date, marital status, bank account statements, credit card transactions, type of stores frequented, sexual orientation, hobbies, and more. Also, the sensitive data 524 may include, actions performed by user on the personal computing device 102 such as an amount of time spent on a website, search terms input user while utilizing a search engine, use of a social media application, types of applications installed on personal computing device 102, and more.

The sensitive data 524 may be stored locally on the personal computing device 102 and not be made available outside of the personal computing device 102 without authorization from the user. In another example, personal computing device 102 may receive an authorization request from the AOD server 106 to access and store the sensitive data 524 at the AOD server 106. Personal computing device 102 may send a response granting access to the AOD server 106 to access and store the sensitive data 524 at the AOD server 106. As part of the access grant response sent, the personal computing device 102 may only grant access to the AOD server 106 to store the sensitive data and would be not grant access for the AOD server 106 to share the sensitive data 524 with any other devices. Specifically, personal computing device 102 would grant access to the AOD server 106 to store the data and not grant access to advertisement campaign provider system 104 to access the sensitive data 524 stored at the AOD server 106. The AOD server 106 stores and/or maintains the sensitive data 524 at the AOD server 106 upon receiving authorization from the personal computing device 102, in response to the received access grant. Further, personal computing device 102 may access the sensitive data 524 stored on the AOD server 106 and cache the sensitive data 524 onto the personal computing device 102 to utilize it to conduct a real time selection of a targeted advertisement.

As an illustration, the sensitive data 524 for a particular user may reveal their particular address as 1234 Empire Street, New York City, USA, when and how many number of times the user has been provided a targeted advertisement campaign, the subject matter of interest to the user (e.g., Italian art and history), types of sports the user is interested in (e.g., football and basketball), musicians of interest to the user (e.g., Beyoncé and Justin Bieber), and other personal data. Types of advertising campaigns associated with such sensitive data may include advertising campaigns that have targeted advertisements that are targeted to users interested in these specific subject matter areas.

At step 712, personal computing device 102 may conduct a real-time selection of one or more discrete advertising campaigns from the set received in operation 704. Each of the plurality of advertising campaigns within the set may be associated with advertising competition rules 518 stored on personal computing device 102. As discussed above, the advertisement competition rules 518 may be received from AOD server 106 in step 704. In another example, a plurality of advertising campaigns 516 and advertisement rules 518 associated with the plurality of advertising campaigns 516 may be previously stored on personal computing device 102(1) (e.g., cached).

Advertising competition rules 518 may include various parameters used to select individual advertisements or campaigns, such as maximum bid price that an advertising campaign is offering, a frequency cap of how many times a user is to be provided an advertising campaign or advertisement, demographic characteristics of users to whom the advertisement is to be provided, behavioral characteristics of users to whom the advertisement is to be provided, and more. Table 1 shows examples of advertising campaigns 1-3 and corresponding advertising competition rules associated with each of the advertising campaigns 1-3. The advertising campaigns 1-3 may be the subset of discrete advertising campaigns received in step 704.

TABLE 1

| Advertising competition rules | Advertising campaign 1 | Advertising campaign 2 | Advertising campaign 3 |
| --- | --- | --- | --- |
| Bid price | $1 | $2 | $1.5 |
| Frequency cap | Once per user/day | Twice per user/day | Twice per user/week |
| Demographic characteristics | Location: New York City | Location: 100 miles radius of New York City | Location: 10-mile radius of New York City |
| | Minimum age 25 years | Maximum age 30 years | Age range 25-40 years |
| Behavioral characteristic | Likes Italian food | Likes Mexican food | Like Mexican food and likes football |
| Applications used | Facebook ™, Instagram ™, Twitter ™ | Facebook ™ | YouTube ™, ESPN ™, NFL ™ |
| Gender | Female | Male | Male |

By way of example, with reference to Table 1, the accessed sensitive data 524 for the user associated with personal computing device 102 may include the frequency cap for the user (i.e., how many times an advertisement or campaign may be provided to personal computing device 102 over a time period), location of the user or device 102, age of the user, behavioral characteristics of the user (e.g., likes or dislikes), applications recently used by the user on device 102, and gender of the user. Of course, in some embodiments, fewer or additional types of sensitive data 524 may be used.

Personal computing device 102 may, as part of operation 712, may compare some or all of the advertising competition rules associated with each of advertising campaigns 1-3 with the accessed sensitive data 524 to identify and select an advertising campaign or advertisement as the winner of the real-time selection. The comparison may look for the nearest or best match, or degree of match, between the sensitive data 524 and the advertising competition rules. In case of a match, process 700 may include accessing additional sensitive data 524 and re-running the comparison, or may alternatively include determining two (or more) winning advertising campaigns based on the comparison. If a winning campaign is determined, but violates a frequency cap (e.g., the same advertisement or campaign has already been shown to the use a threshold number of times), a second-place advertisement or campaign may be selected as the alternate winner. Notably, while the advertisement or campaign selection is able to utilize the sensitive data 524 associated with the user, that sensitive data 524 need not leave the user's device 102. In case the comparison results in identifying none of the advertising campaign as matching with some or all of the advertising competition rules associated with each of advertising campaigns 1-3 with the accessed sensitive data 524, then no advertising campaign may be selected as the winner of the real-time selection. The method would then loop back to step 702.

With reference to FIG. 5, the real-time selection of advertisements or campaigns may be performed by processor 502 executing one or more of programs 512. In other embodiments, the real-time selection of targeted advertisements or campaigns may be performed in whole or in part using a graphics processing unit (GPU) of the target device 102.

The exemplary advertising competition rules of Table 1 above may in some embodiments be specific to the identified advertising opportunity. By way of example, when a user is determined to be at a particular location (e.g., New York City) then the advertising campaigns that include advertising competition rules or demographic characteristic specific to New York City may be selected. As discussed above, the set of advertising competition rules that are provided to the personal computing device 102 may be selected based on non-personal (e.g., non-PII) data. This filtering process may result in relevant campaign selection rules being transmitted to personal computing device 102.

In another example, the personal computing device 102 may update the received advertising competition rules 518 associated with the first subset of discrete advertising campaigns in step 706. By way of example, with reference to Table 1, a received advertising competition rule associated with advertising campaign 1 includes a gender rule of Female (i.e., the advertisement campaign 1 is targeting female users). In step 706, the personal computing device 102 also determines how many of the advertising competition rules the user of the personal computing device 102 satisfies, and corresponding actions to be performed based on the number of advertising competition rules that are satisfied. The personal computing device 102 may determine that the advertising competition rules of frequency cap, demographic characteristics, behavioral characteristics, and applications used are satisfied, and only the rule of gender is not satisfied by the user, as the gender of the user of the personal computing device 102 is male. In this scenario, the personal computing device 102 identifies an opportunity for targeting advertisements to the user if the advertising competition rule includes male users. Upon identifying this opportunity, the personal computing device 102 may update the gender rule associated with advertising campaign 1 to include male as well as female users. This creates advertising competition rules that are specific to the user based on the identified opportunity, and thus creates more opportunities for targeting advertisements. Further, the actions that are to be performed based on the number of advertising competition rules that are satisfied may be, in some embodiments, preprogrammed instructions that are integrated into mobile applications installed on the target device 102. By way of example, the actions that are to be performed based on the number of advertising competition rules may include increasing or decreasing the minimum age requirement rule when all of the competition rules are satisfied (e.g., except for a minimum age requirement rule), or when all of the competition rules are satisfied except one of the rules, then removing that one rule that is not satisfied from making a real time selection a targeted advertisement, or when all of the competition rules are satisfied except two of the rules, then changing those two rules accordingly to satisfy all of the advertising competition rules. Any number and/or type of actions may be performed.

At step 714, personal computing device 102 may retrieve a targeted advertisement associated with a selected advertising campaign. Consistent with the discussion above, the particular advertisement to be received by the personal computing device 102 may come from targeted advertisements 526 stored in memory 504. Alternatively, the particular advertisement to be received may come from a separate content server, content delivery network, advertising network, or other external source. In embodiments where the personal computing device 102 performs a real-time selection in operation 712 to select a particular advertisement, that advertisement may be the one that is delivered to personal computing device. In embodiments, on the other hand, where the personal computing device 102 selects a campaign (rather than a particular advertisement), the specific advertisement actually delivered to the personal computing device 102 may be selected from within the campaign by AOD server 106, advertisement campaign provider system 104, or another source. Once received, the targeted advertisement may be displayed on personal computing device. For example, the advertisement may be integrated into a webpage (e.g., as a banner, pop-up, sound, etc.) or application being accessed by the user. In alternate embodiments, the advertisement may be displayed not on the personal computing device but rather on an environmental display proximate to the user. For example, the advertisement may be displayed on a television, wall display, overhead display, billboard, etc.

In another example, multiple targeted advertisements associated with advertising campaigns may be stored on target device 102 and retrieved when advertising opportunities are detected. In this scenario, personal computing device 102 upon conducting one or more real-time selections may select one or more advertisements or advertising campaigns, in response to which multiple advertisements may be stored (e.g., cached) on personal computing device 102. When new advertising opportunities are detected (e.g., as discussed above, based on a user opening a web page, downloading a web page, following a link to a web page, interacting with an application, etc.), cached advertisements may be retrieved locally from memory 504 and displayed on the target device 102.

In another example, the personal computing device 102(1) may store advertising competition rules in the memory 504 to be utilized for future real-time selections of targeted advertisements or campaigns. According to this technique, because the advertising competition rules are already stored on personal computing device 102, they need not be retrieved in real-time when a future advertising opportunity is detected.

As an alternative to the above discussion of process 700, in some embodiments steps 702-714 may be performed by a proxy server (e.g., proxy server 112, of FIG. 1), rather than only by a personal computing device 102. In this arrangement, upon receiving a targeted advertisement request, proxy server 112 may access the user's personal data 524, perform the real-time selection of an advertisement or campaign based on that data 524, and retrieve a targeted advertisement for display on personal computing device 102. Similar to the techniques above, where proxy server 112 is used in this manner, the privacy of the user's data may still be maintained. For example, while the proxy server may access the sensitive data 524, the data 524 need not be transmitted external to proxy server 112. Accordingly, neither AOD server 106 nor advertisement campaign provider system 104 (nor other external third-parties) may be able to access the user's personal data 524.

Figure 8:
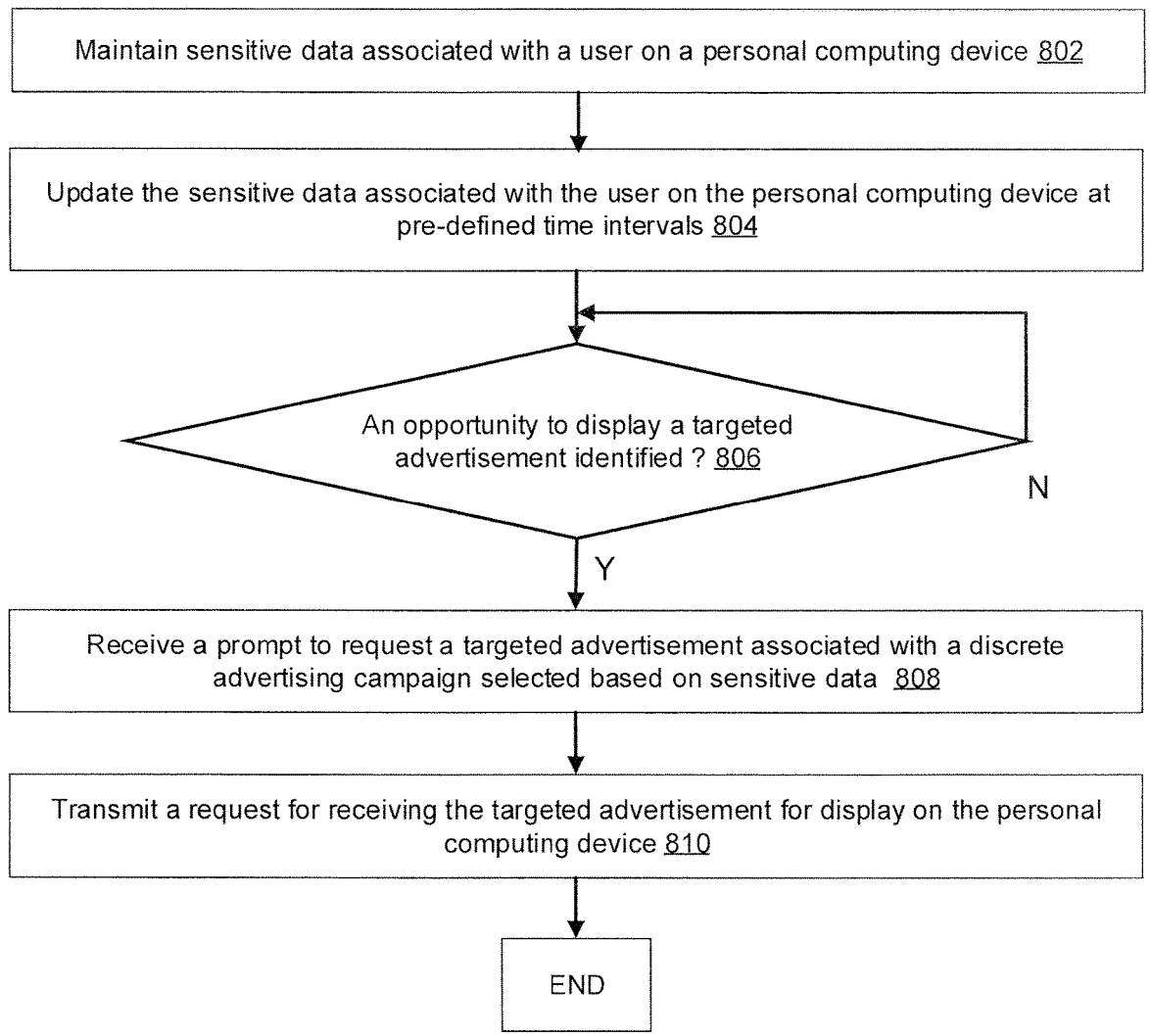
FIG. 8 is a flowchart depicting an exemplary process of receiving a targeted advertisement without revealing sensitive data of a user, in accordance with disclosed embodiments.

FIG. 8 is a flowchart depicting an exemplary process 800 of real-time selection of targeted advertisements by a target device 102 based on sensitive data 524 stored on target device 102, consistent with the disclosed embodiments. In certain aspects, target device 102 may be configured to execute software instructions that perform one or more of the operations of process 800. Alternatively, aspects of process 800 may be performed by proxy server 112.

At step 802, process 800 includes target device 102 maintaining sensitive data 524 associated with a user in the memory 504. Target device 102 is also referred to as a personal computing device 102 associated with a user. As discussed above, sensitive (e.g., PII) data may include various types of behavioral, personal, or activity-based information regarding a user and/or their device that may be used to select targeted advertisements for the user. The user may prefer to keep their sensitive data 524 private and not share the sensitive data 524 outside of the personal computing device 102. The sensitive data stored 524 on target device 102 may be maintained, for example, in a sandbox environment of personal computing device 102. A sandbox environment is a testing environment that isolates untested code changes and outright experimentation from the production environment in a life cycle of software development. In further embodiments, the sensitive data 524 may be stored in an encrypted memory on personal computing device 102, or in a secure processing environment of personal computing device 102 (e.g., Google™ Titan M, Apple™ Secure Enclave, ARM™ TrustZone, etc.). Alternatively, sensitive data 524 may be stored in one or more unencrypted or generally unprotected memories of personal computing device 102.

Consistent with the discussion above, sensitive data 524 may include a specific location of the user, a subject matter of interest to the user, when or how many times the user has been provided a targeted advertisement campaign, the user's personal information, the user's age, the user's marital status, the user's bank account data, the user's credit card transactions, types of stores where the user shops, etc. Also, the sensitive data 524 may include actions performed by the user on the personal computing device 102, such as the amount of time spent on a website, search terms input by the user while utilizing a search engine, the amount of time spent on a social media application, types of applications installed on the personal computing device 102, a time period associated with utilization of applications installed on personal computing device 102, or various other types of actions.

At step 804, personal computing device 102 may update the sensitive data 524 associated with the user on the personal computing device 102(1) at pre-defined time intervals, upon new sensitive data 524 being available (e.g., through an application on personal computing device 102), or upon other actions or events. For example, personal computing device 102 may be configured to automatically refresh or update sensitive data 524 hourly, daily, or upon another time interval. In some embodiments, when new sensitive data 524 is available through an application (e.g., based on a social media post, based on a new financial transaction, based on an update to a user profile, etc.), the stored sensitive data 524 may be updated. Other options for updating sensitive data 524 are possible as well.

At step 806, personal computing device 102 determines whether an opportunity to display a targeted advertisement on display 502 is identified. Identifying of an opportunity may be performed in response to user interaction with applications 514 running on personal computing device 102. The applications 514 may include web browsers, an e-wallet application (e.g. Apple™, Google Pay™, etc.), social media applications, or various other types of applications. As an example, the user interaction may include clicking on a uniform resource locator (URL) of a web page while accessing a browser application running on personal computing device 102. When personal computing device 102 identifies that the user has clicked on a URL, personal computing device 102 identifies this action to be an opportunity to display a targeted advertisement and the method proceeds to step 808. As another example, the interaction may be the user actually downloading the web page, following a link in the web page, interacting with an application that allows for advertisements, or various other types of interactions.

In some embodiments, if in step 806 personal computing device 102 determines that an opportunity to display a targeted advertisement is not identified, then method 800 may loop back to step 806 to continue identifying opportunities to display a targeted advertisement.

At step 808, personal computing device 102 may receive a prompt to request a targeted advertisement associated with a discrete advertising campaign selected based on sensitive data 524. In some embodiments, the prompt may be an embedded link or pointer (e.g., URL) in a web page or application that functions to have the personal computing device 102 request a targeted advertisement. The link or pointer may be activated either visibly to the user or transparently (e.g., automatically as the web page or application is loading). Consistent with the discussion above, the link or pointer may refer to AOD server 106, proxy server 112, or another resource involved in the delivery of advertisements. As discussed above, the request for the targeted advertisement may be based on a real-time selection of a particular advertisement or campaign. The real-time selection may be performed by the personal computing device 102 and may utilize the sensitive data 524 stored on personal computing device.

At step 810, personal computing device 102 may transmit a request to AOD server 106, to proxy server 112, or to another advertisement servicing resource for receiving a targeted advertisement for display on the personal computing device 102. The request may include an identifier associated with a winning advertisement or campaign, as selected by the personal computing device 102 in a real-time selection, as discussed above. In response to the request for a targeted advertisement, personal computing device 102 may receive a targeted advertisement associated with the selected advertisement or advertising campaign. Personal computing device 102 may then display the targeted advertisement on an application in which an opportunity to display the targeted advertisement was identified in step 806.

In another example, in situations where personal computing device 102 has locally cached targeted advertisements (e.g., stored in memory 504), one of those cached advertisements may be retrieved in operation 810. The processor 502 of the personal computing device 102 may retrieve the targeted advertisement associated with the selected advertising campaign from targeted advertisements 526 stored in memory 504. The retrieved targeted advertisement may then be displayed on the application in which an opportunity to display the targeted advertisement was identified in step 806.

In another example, steps 802-806 may be performed by the proxy server 112 instead of by (or in conjunction with) personal computing device 102. Upon identifying an opportunity to display a targeted advertisement, the proxy server 112 may transmit a prompt, in substantially the same manner as step 808, to request a targeted advertisement to the target device 102. In such embodiments, proxy server 112 may have performed a real-time selection of a targeted advertisement on behalf of the personal computing device, as discussed above. Alternatively, if personal computing device 102 performed the real-time selection, the result of the selection (e.g., the winning advertisement or campaign) may be reported to proxy server 112, which then requests a targeted advertisement. In response to the request for the targeted advertisement, proxy server 112 may provide the targeted advertisement to the personal computing device 102 for display. Alternatively, as discussed above, the advertisement may be displayed in proximity to the user (e.g., via a television, wall panel, overhead display, etc.).

The techniques discussed above provide privacy-enhanced and targeting-enhanced methods of real-time selection of targeted advertisements. By performing the selection of targeted advertisements on the target device 102 based on locally stored sensitive data (e.g., PII data), richly targeted advertisements may be provided to users while keeping users' sensitive data private. Users' sensitive data is not made available outside of their personal computing device, other than to sources (if any) the user specifically authorizes. Correspondingly, the valuable and fine-tuned advertisement selection rules that advertisers may develop (e.g., specifying particular demographics, particular behavioral profiles, and particular advertisement pricing) may also be kept private.

Figure 9:
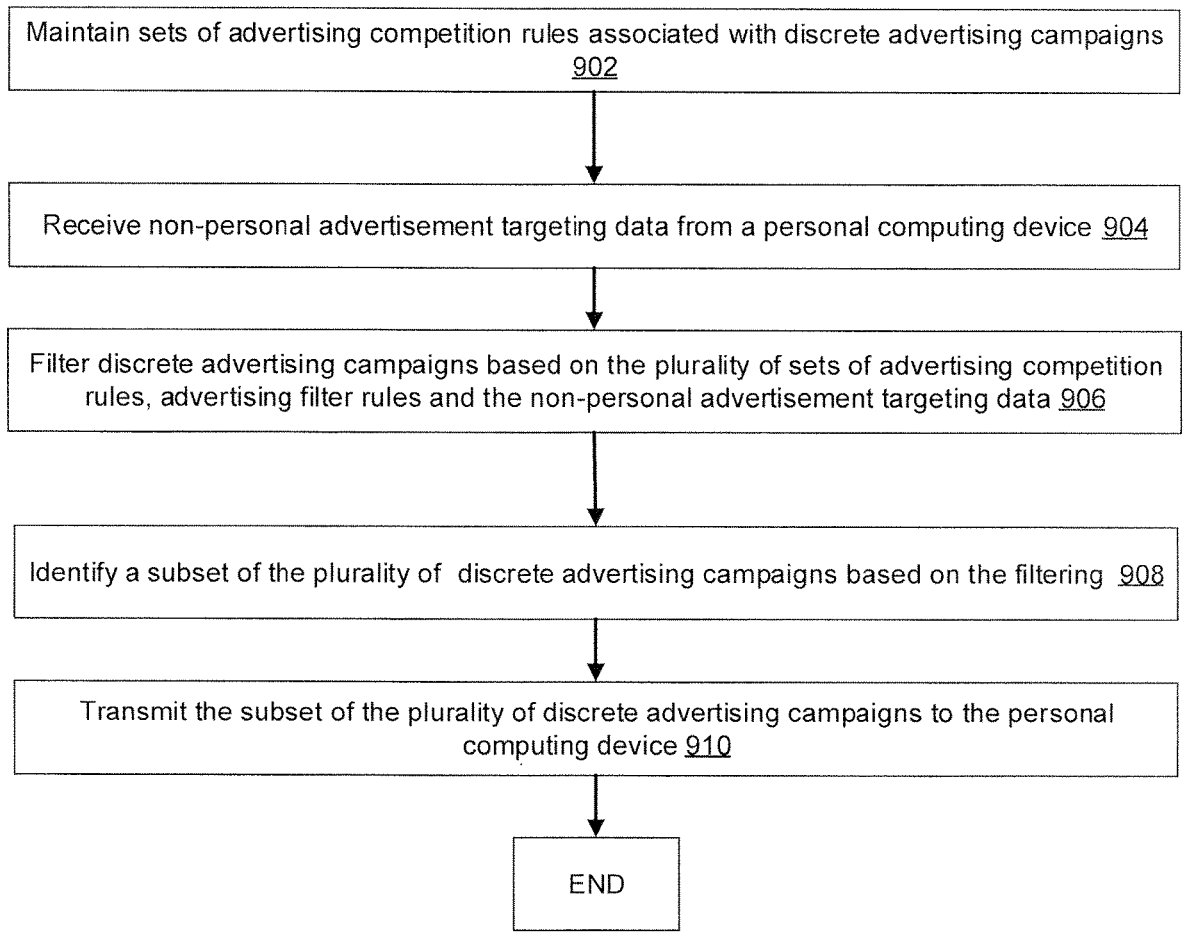
FIG. 9 is a flowchart depicting an exemplary process of efficiently providing advertising competition rules to a personal computing device, in accordance with disclosed embodiments.

FIG. 9 is a flowchart depicting an exemplary process 900 of filtering advertising campaigns by AOD server 106 consistent with the disclosed embodiments. In certain aspects, AOD server 106 may be configured to execute software instructions that perform one or more of the operations of process 900. In alternate embodiments, some or all of process 900 may be performed by proxy server 112.

At step 902, process 900 includes AOD server 106 maintaining sets of advertising competition rules 612 associated with discrete advertising campaigns 614 in memory 606. Advertisement competition rules 612 stored in the AOD server 106 may specify various parameters used in the selection of targeted advertisements, such as a maximum bid price that an advertising campaign is offering for a particular advertisement or campaign, a frequency cap of how many times a user is to be provided a same advertising campaign, demographic characteristics of where and to whom the advertisement is to be provided, behavioral characteristic of to whom the advertisement is to be provided, and various other parameters. The advertising competition rules 612 are capable of being applied by target device 102 as discussed above. Consistent with the discussion above, advertising competition rules 612 may be based on the criteria of Table 1, among other criteria.

At step 904, process 900 includes AOD server 106 receiving non-personal advertisement targeting data 522 from a target device 102. By way of example, the non-personal advertisement targeting data 522 associated with a user may include, for example, a zip code of the user or device 102, operating system of the device 102, network carrier of the device 102, a subject matter interest of the user (e.g., sports, music, reality television, etc.), and/or anonymized version of user identifier, among other types of non-PII data. In an anonymized version of a serial number is used, upon receiving the anonymized version, the AOD server 106 may communicate with database 110 or a separate server to access a lookup table that provides corresponding (non-PII) user identifying information associated with the serial number. The serial number may include, by way of example, a serial number assigned to the user, a serial number assigned to a media access control (MAC) address, subject matter of interest of the user, behavioral characteristics, etc.

At step 906, process 900 includes AOD server 106 filtering discrete advertising campaigns 614 based on the non-personal advertisement targeting data 522 received in step 904. For example, as discussed above, operation 906 may involve matching available advertising campaigns 614, or associated advertising competition rules 612, to non-personal advertisement targeting data 522. This may result in AOD server 106 selecting one, or a relatively small set, of advertising campaigns 614 for which advertising competition rules 612 should be transmitted to a particular personal computing device 102. In this manner, only relevant advertising competition rules 612 are transmitted to personal computing device 102, thus limiting the processing requirements for personal computing device 102 and preserving network bandwidth. Consistent with FIG. 6 above, advertising filter rules 610 may be the rules utilized by the AOD server 106 to filter plurality of advertising campaigns in operation 906.

At step 908, process 900 may include AOD server 106 identifying a subset of the available advertising campaigns that satisfy the filter rules (e.g., filtering rules 610) based on the received non personal advertisement targeting data 522. The identified set of advertising campaigns, or their associated advertisement competition rules, are then sent to the target device 102.

At step 910, process 900 includes AOD server 106 transmitting the identified subset of the advertising campaigns to the target device 102. The identified subset of advertising campaigns including corresponding advertising competition rules 610 are configured to be applied by the personal computing device 102 in a real-time selection of an advertisement or advertising campaign.

Figure 10:
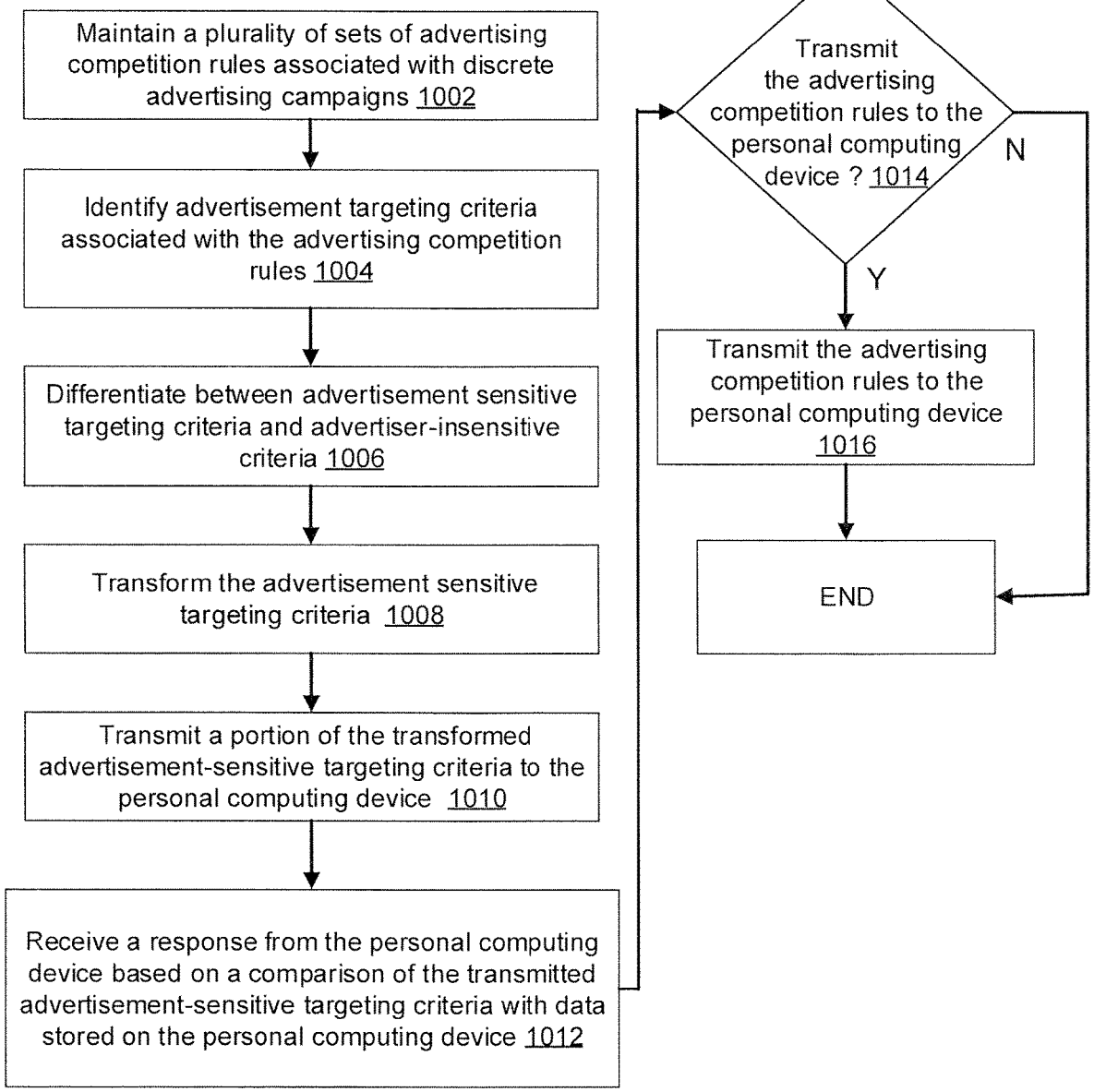
FIG. 10 is a flowchart depicting an exemplary process of performing an advertisement campaign filtering process while protecting advertiser and user privacy, in accordance with disclosed embodiments.

FIG. 10 is a flowchart depicting an exemplary process 1000 of a real-time selection of targeted advertisements by target devices consistent with the disclosed embodiments. In certain aspects, AOD server 106 may be configured to execute software instructions that perform one or more of the operations of process 1000. Alternatively, all or portions of process 1000 may be performed by proxy server 112.

At step 1002, AOD server 106 may maintain sets of advertising competition rules 612 associated with discrete advertising campaigns 614 in memory 606. Advertisement competition rules 612 stored in AOD server 106 may include a variety of parameters based on PII and/or non-PII data, such as network carrier, maximum bid price that an advertisement or advertising campaign is offering, a frequency cap of how many times a user is to be provided an advertisement or advertising campaign, demographic characteristics of where and to whom the advertisement is to be provided, behavioral characteristics of to whom the advertisement is to be provided, device operating system version, etc.

Table 2 shown below is an example of advertising competition rules 612 stored on AOD server 106. Table 2 shows advertising campaigns 4-6 and corresponding advertising competition rules 612 associated with each of the advertising campaigns 4-6. The advertising campaigns 4-6 are a first subset of discrete advertising campaigns 614. The personal computing device 102 may receive and apply the advertising competition rules 612 to determine a targeted advertisement that is then displayed on the personal computing device 102.

At step 1004, AOD server 106 may identify advertisement targeting criteria associated with the advertising competition rules 612. In this step 1004, for example, AOD server 106 may receive requests from advertising campaign provider system 104 to target particular target devices 102(1)-102(n) that satisfy the advertisement targeting criteria of advertising campaigns 4-6. In response to this request, AOD server 106 may identify advertisement targeting criteria associated with advertising campaigns 4-6. In this example, advertisement targeting criteria may include, for example, that the location of the user is New York City, USA, the age of the user is 29 years, the network carrier associated with the personal computing device 102 is Verizon™, etc.

In another example, AOD server 106 may receive an advertising campaign request including a non-personal advertisement targeting data associated with a user of the personal computing device 102. The non-personal advertisement targeting data may include, for example, a location of the user, a network carrier associated with the target device 102, or other non-PII data. In this example, the location of user is New York City, USA, the age of the user is 29 years, the network carrier associated with the personal computing device 102 is Verizon™, etc. In response to the advertising campaign request and the non-personal advertisement targeting data, AOD server 106 may identify advertisement targeting criteria associated with advertising campaign 5 and advertising campaign 6 that match the non-personal advertisement targeting data. Since advertising campaign 4 has advertisement targeting criteria including a demographic characteristic of California, that campaign does not meet the received non-personal advertisement targeting data.

At step 1006, AOD server 106 may differentiate advertiser-sensitive targeting criteria and advertiser-insensitive targeting criteria from the identified advertisement targeting criteria. Advertisement targeting criteria associated with advertising campaign 5 and advertising campaign 6 may include network carrier, advertisement time period, frequency cap, bid price, demographic characteristics, behavioral characteristics, device operating system version, etc. From these advertisement targeting criteria, AOD server 106 may differentiate network carrier, advertisement time period, and frequency cap as advertiser-insensitive targeting

TABLE 2

| Advertising competition rules | Advertising campaign 4 | Advertising campaign 5 | Advertising campaign 6 | Advertiser targeting criteria |
|---|---|---|---|---|
| Network carrier | AT&T ™ | Verizon ™ | Verizon ™ | Advertiser insensitive targeting criteria |
| Advertisement time period | May 1$^{st}$, 2019-May 10$^{th}$, 2019 | Apr. 15$^{th}$, 2019-Apr. 30$^{th}$, 2019 | Jun. 1$^{st}$, 2019-Jun. 5$^{th}$, 2019 | |
| Frequency cap | Once per user/day | Twice per user/day | Twice per user/week | |
| Demographic characteristics | Location: California | Location: New York City | Location: New York City | Advertiser sensitive targeting criteria |
| | Minimum Age 25 years | Maximum Age 30 years | Age range 25-40 years | |
| Behavioral characteristic | Likes Italian food | Likes Mexican food | Likes football | |
| Bid price | $1.50 | $2.50 | $3.50 | |
| Device operating system version | Windows X ™ | Mac OSX ™ | Android ™ | |
| Minimum user income/year | $180,000 | $260,000 | $180,000 | | data, and bid price, demographic characteristics, behavioral characteristics, device operating system version as advertiser-sensitive targeting data. Of course, other differentiations are possible as well, including based on additional parameters.

At step 1008, AOD server 106 transforms (e.g., computationally alters) the advertiser-sensitive targeting criteria in order to keep the advertising campaign targeting data secure. As part of the real-time selection of targeted advertisements by personal computing device 102, AOD server 106 can keep advertising campaigns and advertisement targeting criteria (e.g., bid price, demographic characteristics, behavioral characteristic, device operating system version, and other factors such as shown in Table 2) private and secure without transmitting the data to the target devices 102 or other entities. Likewise, personal computing device 102 may keep sensitive data 524 stored in memory 504 private and secure without transmitting it to AOD server 106. Sensitive data 524 may include, for example, a location and age of the user associated with personal computing device 102.

In order to keep the advertising campaign data private and secure, AOD server 106 may transform the advertiser-sensitive targeting criteria according to a computational technique. As an example, this may include generating a bloom filter along with pointers for each of the advertiser-sensitive targeting criteria associated with advertising campaign 5 and advertising campaign 6. Alternatively, AOD server 106 may transform the advertiser-sensitive targeting criteria to generate another type of filter, such as a lossy filter, bit array filter, etc. The bloom filter may have a pre-defined false-positive error epsilon to be of a smallest desired value. In an example, AOD server 106 may generate a demographic characteristics bloom filter for demographic characteristics included in the advertiser-sensitive targeting criteria. This demographic characteristic bloom filter may be a bit array for the demographic characteristics associated with advertising campaign 5 and advertising campaign 6. That is, the bloom filter generated may be a bit array for a location such as New York City, a maximum age of 30 years, an age range 25-40 years, etc. Similarly, AOD server 106 may also generate a bloom filter for all the advertiser-sensitive targeting criteria associated with advertising campaign 5 and advertising campaign 6.

In step 1010, AOD server 106 may then transmit a portion of the pointers associated with the demographic characteristics bloom filter and bloom parameters to the personal computing device 102. In this step, in order to keep the advertiser-sensitive targeting criteria private and secure, AOD server 106 may divide the pointers associated with the demographic characteristics bloom filter into two parts. A first part may include a first percentage of a pointers that correspond to a first portion of the bit array associated with the demographic characteristics bloom filter that is stored at AOD server 106 (e.g., L % of pointers). This first part of L % of the pointers are stored at the AOD server 106. The second part may include a second percentage of pointers that correspond to a second portion, i.e., the remaining portion of the bit array associated with the demographic characteristics bloom filter (e.g., 100–L % of pointers). This second part of 100–L % of the pointers are transmitted to personal computing device 102.

In step 1012, AOD server 106 may receive a response from the personal computing device 102 based on a comparison performed by the personal computing device 102 of the portion of the 100–N % pointers transmitted in step 1010 and data stored on the personal computing device 102. The data stored on the personal computing device 102 may be the actual demographic characteristic of the user associated with personal computing device 102. In this example, the demographic characteristic may include a specific address or other location of the user and an age of the user. The personal computing device 102, upon receiving the portion of the 100–L % pointers transmitted in step 1010, may utilize the received 100–L % pointers to identify the sensitive data corresponding to the advertiser sensitive data associated with the received pointer as well as bloom parameters. The personal computing device 102 may then utilize the received 100–L % pointers to perform a matching to determine the advertising criteria that matches the pointers. By way of example, the personal computing device 102 may determine the 100–L % pointers associated with advertising campaigns points to the advertiser sensitive data of targeting advertisement towards high income users (e.g., provide advertising campaign 4 to users with salary of $180,000/year or higher). Accordingly, the personal computing device 102 may determine if the received 100–L % pointers points to advertiser sensitive criteria.

If the personal computing device 102 identifies that there is no match between the advertiser sensitive criteria's and the 100–L % pointers (e.g., the personal computing device 102 identifies that not all of the 100–L % bits of the bit array are set in the second part of the bloom filter), then personal computing device 102 may determine that there is no match. In response to determining that there is no match, the personal computing device 102 may transmit a confirmation of an unsuccessful match to AOD server 106. The AOD server 106 may then receive the confirmation of an unsuccessful match and end the process at this step.

On the other hand, if the personal computing device 102 determines that there is a match between the demographic characteristic associated with the user of personal computing device 102 and the received second portion of the bit array including the 100–L % of bit array (i.e., all the bits are set in the 100–L % bit array), then personal computing device 102(1) may determine that there is a possibility of a match. To confirm if the match is correct, personal computing device 102 may then transmit only the remaining L % of the pointers to AOD server 106. Note that the actual plaintext demographic characteristics are not transmitted to AOD server 106 by personal computing device 102. AOD server 106 may receive the response including the remaining L % of the pointers from the personal computing device 102.

The personal computing device 102 upon determining advertiser sensitive criteria based on the received pointers from the server 106, may utilize the received advertising criteria (e.g., an income associated with user, etc.) to select the sensitive data that is to be transformed. In this example, the user sensitive data corresponding to the received advertising criteria may be $190,000/year, this sensitive data may be stored on the personal computing device 102 and transformed based on the received bloom parameters received from the AOD server 106 to generate a bloom filter with pointers, although any another type of filter, such as a lossy filter, bit array filter may also be generated.

Further, by way of example, the personal computing device 102 may generate M number of pointers for the generated bloom filters based on the bloom parameters. The personal computing device 102, upon generating the bloom filter, may generate M number of pointers associated with each of the bloom filters. In this example, a first part of the bit array is associated with the N0 number of pointers, and the second part of the bit array is associated with the remaining portion of the M pointers, e.g., N0–M pointers. The bloom filter may have a pre-defined false-positive error epsilon to be of a smallest desired value. In this example, the bloom filter may be a bit array based on the bloom parameters associated with advertising campaign 4, advertising campaign 5 and advertising campaign 6, i.e., the bloom filter generated may be a bit array for an income associated with user.

In order to keep the user's sensitive data private and secure and on the personal computing device 102, the personal computing device 102 may then transmit the N0 pointers to the AOD server 106. The AOD server 106 may then utilize the received N0 pointers to determine whether the sensitive data associated with the personal computing device 102 matches with the campaign sensitive filter stored at the server. The campaign sensitive filter stored at the server may be filters created by the server for the advertising sensitive criteria stored at the server. By way of example, the server may determine if the N0 pointer that points to the sensitive data of $190,000/year matches with the campaign sensitive filter associated with advertising sensitive criteria of providing advertising campaigns to users with the minimum salary of $180,000/year criteria associated with advertising campaign 4 and advertising campaign 6.

If the server determines that there is no match, e.g., in this example, as the advertising campaign 5 does not satisfy the criteria of providing advertisements to users with post-doctoral degrees, as the minimum income associated with the user of the personal computing device 102 is $190,000, while the minimum income required to satisfy advertising campaign 5 is $260,000.

On the other hand, if the server determines that there is a match, e.g., in this example, the advertising campaign 4 and advertising campaigns 6 satisfy the criteria of $180,000 of user income, as the user's income is $190,000, then upon the match based on the partial information received from pointers associated with the first part of the sensitive data, the AOD server 106 would proceed to determine that there is a possibility of a match. To confirm if the match is correct, AOD server 106 may then transmit only the remaining N0–M pointers of the M pointers to the personal computing device 102. Note that the actual plaintext demographic characteristics need not be transmitted by the AOD server 106 to the personal computing device 102. AOD server 106 may receive the response including the remaining N % of the M pointers from the personal computing device 102.

In step 1014, AOD server 106 may determine whether advertising competition rules associated with the advertising campaigns 5 and 6, from Table 2, are to be transmitted to personal computing device 102. When AOD server 106 receives the response including the remaining N % of the M pointers from the personal computing device 102, the AOD server 106 may compare the received N % of the M pointers to the N % of the bit array associated with the demographic characteristic bloom filter stored at AOD server 106 to determine if there is a match. If AOD server 106 determines that there is a match, AOD server 106 may take the "Yes" branch in process 1000 to step 1016.

In step 1016, AOD server 106 may transmit the advertising competition rules associated with the advertising campaigns 5 and 6 to the personal computing device 102. As discussed above, the advertising competition rules may then be stored (e.g., temporarily or cached) at personal computing device 102. In embodiments involving proxy server 112, the advertising competition rules may be transmitted to proxy server 112, as discussed above.

If in step 1014 AOD server 106 compares the received N % of the M pointers to the N % of the bit array associated with the demographic characteristic bloom filter stored at AOD server 106, and determines that there is no match, then AOD server 106 may take the "No" branch and process 1000 may end there.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for performing an advertisement campaign filtering process while protecting the privacy of both an advertiser and a user of a personal computing device, comprising:
　　maintaining a plurality of sets of advertising competition rules, the plurality of sets of advertising competition rules being associated with a plurality of discrete advertising campaigns, wherein the plurality of sets of advertising competition rules are capable of being applied by the personal computing device;
　　for a set of advertising competition rules from the plurality of sets of advertising competition rules:
　　　　identifying advertisement targeting criteria associated with the set of advertising competition rules,
　　　　differentiating, from within the advertisement targeting criteria, between advertisement-sensitive targeting criteria and advertiser-insensitive criteria,
　　　　transforming the advertisement-sensitive targeting criteria, the transforming resulting in at least two portions of transformed advertisement-sensitive targeting criteria, and transmitting, to the personal computing device, a first of the at least two portions and storing a second of the at least two portions on a server device remote from the personal computing device, wherein the first portion and the second portion are separated from each other upon transmitting the first portion to the personal computing device;

receiving a response from the personal computing device, the response being based on a comparison, by the personal computing device, of the transmitted advertisement-sensitive targeting criteria with data stored on the personal computing device; and determining, based on the response, whether the set of advertising competition rules should be transmitted to the personal computing device.

2. The non-transitory computer readable medium of claim 1, wherein transforming the advertisement-sensitive targeting criteria includes applying a lossy filter to the advertisement-sensitive targeting criteria.

3. The non-transitory computer readable medium of claim 1, wherein transforming the advertisement-sensitive targeting criteria includes applying a bit array filter to the advertisement-sensitive targeting criteria.

4. The non-transitory computer readable medium of claim 1, wherein transforming the advertisement-sensitive targeting criteria includes applying a Bloom filter to the advertisement-sensitive targeting criteria.

5. The non-transitory computer readable medium of claim 1, wherein the data stored on the personal computing device used in the comparison is sensitive data of a user of the personal computing device.

6. The non-transitory computer readable medium of claim 1, wherein the data stored on the personal computing device used in the comparison is not transmitted from the personal computing device.

7. The non-transitory computer readable medium of claim 1, wherein the transformed advertisement-sensitive targeting criteria is expressed in a bit array.

8. The non-transitory computer readable medium of claim 1, wherein the response from the personal computing device includes one or more pointers corresponding to the bit array.

9. A computer-implemented method for performing an advertisement campaign filtering process while protecting the privacy of both an advertiser and a user of a personal computing device, comprising:

maintaining a plurality of sets of advertising competition rules, the plurality of sets of advertising competition rules being associated with a plurality of discrete advertising campaigns, wherein the plurality of sets of advertising competition rules are capable of being applied by the personal computing device;

for a set of advertising competition rules from the plurality of sets of advertising competition rules:

identifying advertisement targeting criteria associated with the set of advertising competition rules, differentiating, from within the advertisement targeting criteria, between advertisement-sensitive targeting criteria and advertiser-insensitive criteria, transforming the advertisement-sensitive targeting criteria, the transforming resulting in at least two portions of transformed advertisement-sensitive targeting criteria, and transmitting, to the personal computing device, a first of the at least two portions and storing a second of the at least two portions on a server device remote from the personal computing device, wherein the first portion and the second portion are separated from each other upon transmitting the first portion to the personal computing device;

receiving a response from the personal computing device, the response being based on a comparison, by the personal computing device, of the transmitted advertisement-sensitive targeting criteria with data stored on the personal computing device; and determining, based on the response, whether the set of advertising competition rules should be transmitted to the personal computing device.

10. The computer-implemented method of claim 9, wherein transforming the advertisement-sensitive targeting criteria includes applying a lossy filter to the advertisement-sensitive targeting criteria.

11. The computer-implemented method of claim 9, wherein transforming the advertisement-sensitive targeting criteria includes applying a bit array filter to the advertisement-sensitive targeting criteria.

12. The computer-implemented method of claim 9, wherein transforming the advertisement-sensitive targeting criteria includes applying a Bloom filter to the advertisement-sensitive targeting criteria.

13. The computer-implemented method of claim 9, wherein the data stored on the personal computing device used in the comparison is sensitive data of a user of the personal computing device.

14. The computer-implemented method of claim 9, wherein the data stored on the personal computing device used in the comparison is not transmitted from the personal computing device.

15. The computer-implemented method of claim 9, wherein the transformed advertisement-sensitive targeting criteria is expressed in a bit array.

16. The computer-implemented method of claim 9, wherein the response from the personal computing device includes one or more pointers corresponding to the bit array.

* * * * *